(12) United States Patent
Bedford et al.

(10) Patent No.: US 7,347,892 B2
(45) Date of Patent: Mar. 25, 2008

(54) PHASE CHANGE INKS CONTAINING MODIFIED PIGMENT PARTICLES

(75) Inventors: Christine E Bedford, Burlington (CA); Marcel P Breton, Mississauga (CA)

(73) Assignee: Xerox Corporation, Stamford, CT (US)

( * ) Notice: Subject to any disclaimer, the term of this patent is extended or adjusted under 35 U.S.C. 154(b) by 266 days.

(21) Appl. No.: 10/918,808

(22) Filed: Aug. 13, 2004

(65) Prior Publication Data

US 2006/0035999 A1    Feb. 16, 2006

(51) Int. Cl.
*C09D 11/02* (2006.01)
(52) U.S. Cl. ............... 106/31.6; 106/31.61; 106/31.86
(58) Field of Classification Search ............... 106/31.6, 106/31.61, 31.86
See application file for complete search history.

(56) References Cited

U.S. PATENT DOCUMENTS

| | | | |
|---|---|---|---|
| 3,653,932 A | 4/1972 | Berry et al. .................. 106/22 |
| 4,390,369 A | 6/1983 | Merritt et al. ................ 106/31 |
| 4,484,948 A | 11/1984 | Merritt et al. ................ 106/31 |
| 4,530,961 A | 7/1985 | Nguyen et al. ............. 524/832 |
| 4,684,956 A | 8/1987 | Ball ............................. 346/1.1 |
| 4,851,045 A | 7/1989 | Taniguchi .................... 106/31 |
| 4,889,560 A | 12/1989 | Jaeger et al. ................ 106/27 |
| 4,889,761 A | 12/1989 | Titterington et al. ........ 428/195 |
| 5,006,170 A | 4/1991 | Schwarz et al. ............. 106/20 |
| 5,019,166 A | 5/1991 | Schwarz ...................... 106/22 |
| 5,053,079 A | 10/1991 | Haxell et al. ................ 106/31 |
| 5,151,120 A | 9/1992 | You et al. .................... 106/27 |
| 5,184,148 A | 2/1993 | Suga et al. ................... 346/1.1 |
| 5,221,335 A | 6/1993 | Williams et al. ........... 106/23 A |
| 5,281,261 A | 1/1994 | Lin .......................... 106/20 R |
| 5,372,852 A | 12/1994 | Titterington et al. ........ 427/288 |
| 5,405,438 A * | 4/1995 | Fujioka .................... 106/31.61 |
| 5,496,879 A | 3/1996 | Griebel et al. .............. 524/320 |
| 5,554,739 A | 9/1996 | Belmont ...................... 534/885 |
| 5,571,311 A | 11/1996 | Belmont et al. .......... 106/20 R |
| 5,621,022 A | 4/1997 | Jaeger et al. ................ 523/161 |
| 5,626,654 A | 5/1997 | Breton et al. ............. 106/31.33 |
| 5,630,868 A | 5/1997 | Belmont et al. ......... 106/31.75 |
| 5,633,109 A | 5/1997 | Jennings et al. ............ 430/115 |
| 5,672,198 A | 9/1997 | Belmont .................... 106/20 R |
| 5,698,016 A | 12/1997 | Adams et al. .............. 106/316 |
| 5,707,432 A | 1/1998 | Adams et al. ............. 106/31.6 |
| 5,713,988 A | 2/1998 | Belmont et al. .......... 106/31.6 |
| 5,782,966 A | 7/1998 | Bui et al. ................. 106/31.43 |
| 5,800,600 A | 9/1998 | Lima-Marques et al. 106/31.29 |
| 5,803,959 A | 9/1998 | Johnson et al. .......... 106/31.75 |
| 5,837,045 A | 11/1998 | Johnson et al. .......... 106/31.85 |
| 5,851,280 A | 12/1998 | Belmont et al. ............. 106/472 |
| 5,885,335 A | 3/1999 | Adams et al. .............. 106/316 |
| 5,895,522 A | 4/1999 | Belmont et al. .......... 106/31.6 |
| 5,900,029 A | 5/1999 | Belmont et al. ............. 8/550 |
| 5,902,841 A | 5/1999 | Jaeger et al. ............... 523/161 |
| 5,922,118 A | 7/1999 | Johnson et al. ............ 106/31.6 |
| 5,994,453 A | 11/1999 | Banning et al. ............. 524/590 |
| 6,042,643 A | 3/2000 | Belmont et al. ............. 106/472 |
| 6,048,925 A | 4/2000 | Titterington et al. ........ 524/590 |
| 6,110,264 A | 8/2000 | Banning et al. ......... 106/31.29 |
| 6,174,937 B1 | 1/2001 | Banning et al. ............. 523/160 |
| 6,177,498 B1 | 1/2001 | Rehman ...................... 524/388 |
| 6,309,453 B1 | 10/2001 | Banning et al. ......... 106/31.29 |
| 6,336,965 B1 | 1/2002 | Johnson et al. ............ 106/31.6 |
| 6,380,423 B2 | 4/2002 | Banning et al. ............. 560/158 |
| 6,398,858 B1 | 6/2002 | Yu et al. .................. 106/31.64 |
| 6,472,471 B2 | 10/2002 | Cooke et al. ............... 525/165 |
| 6,494,943 B1 | 12/2002 | Yu et al. .................. 106/31.65 |
| 6,506,245 B1 | 1/2003 | Kinney et al. ............... 106/493 |
| 6,702,884 B2 * | 3/2004 | Brown .................... 106/31.61 |
| 6,878,198 B1 * | 4/2005 | Drappel et al. .......... 106/31.86 |

FOREIGN PATENT DOCUMENTS

| | | |
|---|---|---|
| EP | 0 206 286 | 6/1986 |
| EP | 0 187 352 | 7/1986 |
| EP | 0 797 635 B1 | 2/2000 |
| EP | 0 797 636 B1 | 5/2000 |
| EP | 0 910 611 B1 | 10/2001 |
| EP | 1 007 595 B1 | 4/2003 |
| EP | 1 220 879 B1 | 5/2003 |
| WO | WO 91/15425 | 10/1991 |
| WO | WO 92/13983 | 8/1992 |
| WO | WO 94/04619 | 3/1994 |
| WO | WO 96/18688 | 6/1996 |
| WO | WO 96/18690 | 6/1996 |

OTHER PUBLICATIONS

Copending U.S. Appl. No. 10/722,164, filed Nov. 25, 2003, entitled "Phase Change Inks and Process for the Preparation Thereof," by Stephan V. Drappel et al.

Copending U.S. Appl. No. 10/722,162, filed Nov. 25, 2003, entitled "Phase Change Inks," by Raymond W. Wong et al.

Copending U.S. Appl. No. 10/721,851, filed Nov. 25, 2003, entitled "Processes for Preparing Phase Change Inks," by Raymond W. Wong et al.

(Continued)

*Primary Examiner*—J. A. Lorengo
*Assistant Examiner*—Veronica Faison-Gee
(74) *Attorney, Agent, or Firm*—Judith L. Byorick

(57) ABSTRACT

Disclosed is a phase change ink composition comprising (a) an ink carrier comprising (1) a polyalkylene wax and (2) a component selected from the group consisting of (A) amides, (B) esters, (C) ester-amides, (D) urethanes, (E) ureas, (F) urethane-ureas, and (G) mixtures thereof, and (b) pigment particles having hydrophobic functional groups covalently bonded to the surfaces thereof, said ink composition having a melting point no lower than about 40° C., said ink composition having a melting point no higher than about 160° C.

45 Claims, No Drawings

OTHER PUBLICATIONS

Copending U.S. Appl. No. 10/881,047, filed Jun. 30, 2004, entitled "Phase Change Ink Printing Process," by Bo Wu et al.
English abstract for German Patent Publication DE 4205636AL.
English abstract for German Patent Publication DE 4205713AL.
H. Kunieda et al., "Formation of Reversed Vesicles," *J. Am. Chem. Soc.*, 1991, 113, 1051-1052.

* cited by examiner

PHASE CHANGE INKS CONTAINING MODIFIED PIGMENT PARTICLES

CROSS-REFERENCE TO RELATED APPLICATIONS

Copending application U.S. Ser. No. 10/722,164, filed Nov. 25, 2003, entitled "Phase Change Inks and Process for the Preparation Thereof," with the named inventors Stephan V. Drappel, Marcel P. Breton, James D. Mayo, Raymond W. Wong, Christine E. Bedford, Danielle C. Boils-Boissier, Sandra J. Gardner, and Paul F. Smith, the disclosure of which is totally incorporated herein by reference, discloses phase change ink compositions comprising (a) an ink carrier comprising a monoamide and a tetra-amide, and (b) pigment particles having oxygen-containing functional groups on the surfaces thereof. Also, processes for preparing a phase change ink which comprise (a) melting a tetra-amide which is solid at about 25° C.; (b) admixing with the molten tetra-amide pigment particles having oxygen-containing functional groups on the surfaces thereof; (c) maintaining the mixture of pigment and tetra-amide at a temperature of at least about 100° C. and at a temperature of no more than about 200° C. for a period sufficient to enable the molten tetra-amide to wet the pigment particle surfaces; (d) subsequent to wetting of the pigment particle surfaces with the molten tetra-amide, adding to the mixture a monoamide; (e) subsequent to addition of the monoamide, subjecting the resulting mixture to high shear mixing; and (f) subsequent to subjecting the mixture to high shear mixing, optionally adding to the mixture additional ink ingredients.

Copending application U.S. Ser. No. 10/722,162, filed Nov. 25, 2003, entitled "Phase Change Inks," with the named inventors Raymond W. Wong, Stephan V. Drappel, Paul F. Smith, C. Geoffrey Allen, and Caroline M. Turek, the disclosure of which is totally incorporated herein by reference, discloses an ink composition comprising (a) an ink carrier which comprises a monoamide, a tetra-amide, or a mixture thereof; (b) a polyalkylene succinimide; and (c) pigment particles. Also disclosed is an ink composition comprising (a) an ink carrier, (b) a polyalkylene succinimide, and (c) pigment particles, said ink having a conductivity greater than 1×10-8 Siemens per centimeter. Also disclosed is an ink set comprising (1) a first ink comprising (a) an ink carrier, (b) a polyalkylene succinimide, and (c) pigment particles, and (2) a second ink comprising a dye colorant and a second ink carrier, wherein the first ink carrier contains substantially the same components as the second ink carrier.

Copending application U.S. Ser. No. 10/721,851, filed Nov. 25, 2003, entitled "Processes for Preparing Phase Change Inks," with the named inventors Raymond W. Wong, Hadi K. Mahabadi, Paul F. Smith, Sheau Van Kao, Michael S. Hawkins, and Caroline M. Turek, the disclosure of which is totally incorporated herein by reference, discloses a process for preparing a phase change ink composition which comprises (a) a phase change ink carrier, said carrier comprising at least one nonpolar component and at least one polar component, and (b) pigment particles, said process comprising (1) selecting at least one of the polar carrier components to be a pigment particle dispersant; (2) admixing the pigment particles with the dispersant; (3) extruding the mixture of pigment particles and dispersant in an extruder at a temperature that is at or above about the peak crystallization temperature of the dispersant and below about the peak melting temperature of the dispersant, thereby forming a pigment dispersion; (4) subsequent to extrusion of the pigment dispersion, adding to the pigment dispersion any remaining polar components and the nonpolar component; and (5) subjecting the resulting mixture of pigment dispersion, polar component, and nonpolar component to high shear mixing to form an ink.

Copending application U.S. Ser. No. 10/881,047, filed Jun. 30, 2004, entitled "Phase Change Ink Printing Process," with the named inventors Bo Wu, Donald R. Titterington, and Mary Ryan-Hotchkiss, the disclosure of which is totally incorporated herein by reference, discloses a phase change ink composition comprising (1) an ink carrier comprising (A) a first component which comprises an ester-amide material, and (B) a second component which comprises either (i) a material selected from the group consisting of urethane compounds, urea compounds, urethane-urea compounds, and mixtures thereof, (ii) a polyalkylene wax, or (iii) a mixture thereof; and (2) a colorant.

BACKGROUND

Disclosed herein are phase change inks and methods for the use thereof. More specifically, disclosed herein are phase change inks containing modified pigment particles. One embodiment is directed to a phase change ink composition comprising (a) an ink carrier comprising (1) a polyalkylene wax and (2) a component selected from the group consisting of (A) amides, (B) esters, (C) ester-amides, (D) urethanes, (E) ureas, (F) urethane-ureas, and (G) mixtures thereof, and (b) pigment particles having hydrophobic functional groups covalently bonded to the surfaces thereof, said ink composition having a melting point no lower than about 40° C., said ink composition having a melting point no higher than about 160° C.

In general, phase change inks (sometimes referred to as "hot melt inks") are in the solid phase at ambient temperature, but exist in the liquid phase at the elevated operating temperature of an ink jet printing device. At the jet operating temperature, droplets of liquid ink are ejected from the printing device and, when the ink droplets contact the surface of the recording substrate, either directly or via an intermediate heated transfer belt or drum, they quickly solidify to form a predetermined pattern of solidified ink drops. Phase change inks have also been used in other printing technologies, such as gravure printing, as disclosed in, for example, U.S. Pat. No. 5,496,879 and German Patent Publications DE 4205636AL and DE 4205713AL, the disclosures of each of which are totally incorporated herein by reference.

Phase change inks for color printing typically comprise a phase change ink carrier composition which is combined with a phase change ink compatible colorant. In a specific embodiment, a series of colored phase change inks can be formed by combining ink carrier compositions with compatible subtractive primary colorants. The subtractive primary colored phase change inks can comprise four component dyes, namely, cyan, magenta, yellow and black, although the inks are not limited to these four colors. These subtractive primary colored inks can be formed by using a single dye or a mixture of dyes. For example, magenta can be obtained by using a mixture of Solvent Red Dyes or a composite black can be obtained by mixing several dyes. U.S. Pat. Nos. 4,889,560, 4,889,761, and 5,372,852, the disclosures of each of which are totally incorporated herein by reference, teach that the subtractive primary colorants employed can comprise dyes from the classes of Color Index (C.I.) Solvent Dyes, Disperse Dyes, modified Acid and Direct Dyes, and Basic Dyes. The colorants can also include pigments, as disclosed in, for example, U.S. Pat. No. 5,221, 335, the disclosure of which is totally incorporated herein by reference. U.S. Pat. No. 5,621,022, the disclosure of which is totally incorporated herein by reference, discloses the use of a specific class of polymeric dyes in phase change ink compositions.

Phase change inks have also been used for applications such as postal marking, industrial marking, and labelling.

Phase change inks are desirable for ink jet printers because they remain in a solid phase at room temperature during shipping, long term storage, and the like. In addition, the problems associated with nozzle clogging as a result of ink evaporation with liquid ink jet inks are largely eliminated, thereby improving the reliability of the ink jet printing. Further, in phase change ink jet printers wherein the ink droplets are applied directly onto the final recording substrate (for example, paper, transparency material, and the like), the droplets solidify immediately upon contact with the substrate, so that migration of ink along the printing medium is prevented and dot quality is improved.

Compositions suitable for use as phase change ink carrier compositions are known. Some representative examples of references disclosing such materials include U.S. Pat. Nos. 3,653,932, 4,390,369, 4,484,948, 4,684,956, 4,851,045, 4,889,560, 5,006,170, 5,151,120, 5,372,852, 5,496,879, European Patent Publication 0187352, European Patent Publication 0206286, German Patent Publication DE 4205636AL, German Patent Publication DE 4205713AL, and PCT Patent Application WO 94/04619, the disclosures of each of which are totally incorporated herein by reference. Suitable carrier materials can include paraffins, microcrystalline waxes, polyethylene waxes, ester waxes, fatty acids and other waxy materials, fatty amide containing materials, sulfonamide materials, resinous materials made from different natural sources (tall oil rosins and rosin esters, for example), and many synthetic resins, oligomers, polymers, and copolymers.

U.S. Pat. No. 4,889,560 (Jaeger et al.), the disclosure of which is totally incorporated herein by reference, discloses a phase change ink carrier composition combined with a compatible colorant to form a phase change ink composition. A thin film of substantially uniform thickness of that phase change ink carrier composition, and the ink produced therefrom, has a high degree of lightness and chroma. The thin films of a substantially uniform thickness of the ink composition are also rectilinearly light transmissive. The carrier composition is preferably a fatty amide-containing compound.

U.S. Pat. No. 4,889,761 (Titterington et al.), the disclosure of which is totally incorporated herein by reference, discloses a method for producing a light-transmissive phase change ink printed substrate is described which comprises providing a substrate, and then printing on at least one surface of the substrate a predetermined pattern of a light-transmissive phase change ink which initially transmits light in a non-rectilinear path. The pattern of solidified phase change ink is then reoriented to form an ink layer of substantially uniform thickness. This ink layer will, in turn, produce an image which then will transmit light in a substantially rectilinear path. In one aspect of the invention, the substrate is light transmissive, and the reoriented printed substrate exhibits a high degree of lightness and chroma, and transmits light in a substantially rectilinear path. In this way, the reoriented printed substrate can be used in a projection device to project an image containing clear, saturated colors.

U.S. Pat. No. 5,372,852 (Titterington et al.), the disclosure of which is totally incorporated herein by reference, discloses a phase change ink composition that is indirectly applied to a substrate by raising the temperature of the phase change ink composition to form a liquid phase change ink composition, applying droplets of the phase change ink composition in a liquid phase to a liquid intermediate transfer surface on a solid support in a pattern using a device such as an ink jet printhead, solidifying the phase change ink composition on the liquid intermediate transfer surface, transferring the phase change ink composition from the liquid intermediate transfer surface to the substrate, and fixing the phase change ink composition to the substrate. The phase change ink composition is malleable when the ink is transferred from the intermediate transfer surface to the substrate and is ductile after the ink has been transferred to the substrate and cooled to ambient temperature to preclude the ink from crumbling and cracking.

U.S. Pat. No. 5,621,022 (Jaeger et al.), the disclosure of which is totally incorporated herein by reference, discloses a phase change ink composition wherein the ink composition utilizes polymeric dyes in combination with a selected phase change ink carrier composition.

U.S. Pat. No. 5,782,966 (Bui et al.), the disclosure of which is totally incorporated herein by reference, discloses resins and waxes made by reacting selected nucleophiles, including alcohols and/or amines, with an isocyanate. The order of addition of the isocyanate and the different nucleophiles can tailor the distribution of di-urethane, mixed urethane/urea, and/or di-urea molecules in the final resin product. The isocyanate-derived resin and wax materials are useful as ingredients as phase change ink carrier compositions used to make phase change ink jet inks.

U.S. Pat. No. 5,902,841 (Jaeger et al.), the disclosure of which is totally incorporated herein by reference, discloses a phase change ink composition wherein the ink composition utilizes colorant in combination with a selected phase change ink carrier composition containing at least one hydroxy-functional fatty amide compound.

U.S. Pat. No. 5,994,453 (Banning et al.), the disclosure of which is totally incorporated herein by reference, discloses phase change carrier compositions made from the combination of at least one urethane resin; at least one urethane/urea resin; at least one mono-amide; and at least one polyethylene wax. The order of addition of the reactants to form the reactant product urethane resin and urethane/urea resin permits the tailoring or design engineering of desired properties.

U.S. Pat. No. 6,174,937 (Banning et al.), the disclosure of which is totally incorporated herein by reference, discloses a phase change ink comprising a material of the formula

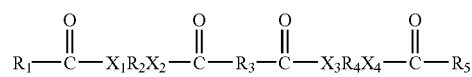

wherein $X_1$, $X_2$, $X_3$, and $X_4$ are segments comprising atoms selected from groups V and VI of the periodic table; wherein at least one $R_1$ and $R_5$ comprises at least 37 carbon units; and wherein $R_2$, $R_3$, and $R_4$ each comprise at least one carbon unit. The invention further encompasses a composition of matter, as well as methods of reducing coefficients of friction of phase change ink formulations.

U.S. Pat. No. 6,309,453 (Banning et al.), the disclosure of which is totally incorporated herein by reference, discloses colorless compounds having a central core and at least two arms extending from the core. The core can comprise one or more atoms. The at least two arms have the formula

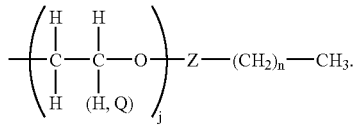

In such formula, Z is a segment of one or more atoms; j is an integer from 1 to about 300 and can be different at one of the at least two arms than at another of the at least two arms; Q is an alkyl or aryl group and can vary amongst different alkyl and aryl groups within the colorless compound; and n is an integer greater than 1 and can be different at one of the at least two arms than at another of the at least two arms. In other aspects, the invention encompasses phase change inks incorporating the above-described colorless compound as toughening agent, and methods of printing with such phase change inks. The invention further includes a solid ink comprising a colorant and a colorless compound of the formula

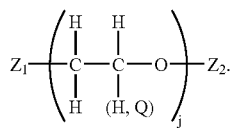

In such formula, X is a single atom corresponding to N or O; $Z_1$ and $Z_2$ are substituents comprising one or more atoms, and can be the same as one another or different from one another; and j is an integer from 1 to about 50.

U.S. Pat. No. 6,380,423 (Banning et al.), the disclosure of which is totally incorporated herein by reference, discloses colorless compounds having a central core and at least two arms extending from the core. The core can comprise one or more atoms. The at least two arms have the formula

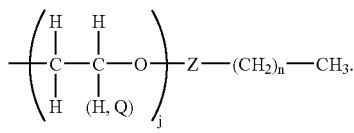

In such formula, Z is a segment of one or more atoms; j is an integer from 1 to about 300 and can be different at one of the at least two arms than at another of the at least two arms; Q is an alkyl or aryl group and can vary amongst different alkyl and aryl groups within the colorless compound; and n is an integer greater than 1 and can be different at one of the at least two arms than at another of the at least two arms. In other aspects, the invention encompasses phase change inks incorporating the above-described colorless compound as toughening agent, and methods of printing with such phase change inks. The invention further includes a solid ink comprising a colorant and a colorless compound of the formula $$Z_1\text{---}\left(\begin{array}{cc}H & H \\ | & | \\ C\text{---}C\text{---}O \\ | & | \\ H & (H, Q)\end{array}\right)_j\text{---}Z_2.$$

In such formula, X is a single atom corresponding to N or O; $Z_1$ and $Z_2$ are substituents comprising one or more atoms, and can be the same as one another or different from one another; and j is an integer from 1 to about 50.

U.S. Pat. No. 5,221,335 (Williams et al.), the disclosure of which is totally incorporated herein by reference, discloses a stabilized pigmented hot melt ink containing a thermoplastic vehicle, a coloring pigment, and a dispersion-stabilizing agent to inhibit settling or agglomeration of the pigment when the ink is molten, comprising 1.5 to 20 weight percent of a nitrogen-modified acrylate polymer. A preferred dispersion-stabilizing agent is the nitrogen-modified methacrylate polymer marketed by Rohm and Haas as Plexol 1525.

U.S. Pat. No. 5,800,600 (Lima-Marquez et al.), the disclosure of which is totally incorporated herein by reference, discloses a solid ink jet ink composition which is suitable for hot melt applications having a carrier having an electrical resistivity of at least $10^8$ Ohm.cm, insoluble marking particles, and a particle charging agent dispersed in it. The marking particle may be a pigment, an insoluble dyestuff, a polymer, or mixture thereof. The particle charging agent may be a metal soap, a fatty acid, lecithin, an organic phosphorous compound, a succinimide, a sulfosuccinate, petroleum sulfonates, a soluble or partially soluble resin such as a modified rosin ester, an acrylic, a vinyl, a hydrocarbon, or a mixture thereof. The solid ink jet ink composition may further include a viscosity controller. The ink may be capable of being heated to 155° C. and have at that temperature a viscosity of between 5 to 150 centipoise.

U.S. Pat. No. 6,494,943 (Yu et al.), the disclosure of which is totally incorporated herein by reference, discloses colored pigments having one or more desired parameters and/or properties. These parameters and/or properties include: a) a particles size of from about 10 nm to about 300 nm; b) an accusizer number of less than $10^{10}$ particles/ml of dispersion at 15% solids which are greater than 0.5 micron; c) a filterability such that when in a liquid medium, 100 ml having 10% solids of the colored pigment filters through a 3 micron nylon absolute filter; d) a colored pigment purity of greater than about 80%, based on extractable material; and/or e) a stability such that the above-described properties do not change by more than 50% at 25° C. for at least one week. Colored pigments having at least one organic group and having one or more of the above-described characteristics is also described as well as a process for preparing surface-modified colored pigments. The process involves combining at least one treating agent and at least one type of colored pigment(s) in a container to form a mixture and subjecting the mixture to high shearing and introducing at least one diazotizing agent to the mixture at least for a portion of time while the high shearing is taking place, and preferably during the entire time that high shearing is taking place, such that a reaction product is formed and contains surface-modified colored pigment(s).

U.S. Pat. No. 6,472,471 (Cooke et al.), the disclosure of which is totally incorporated herein by reference, discloses various modified carbon products which can form a part of a polymeric product containing the modified carbon product and a polymer. One type of modified carbon product disclosed is a carbon product having attached at least one organic group, monomeric group, or polymeric group. Another type of modified carbon product disclosed is a carbon product having attached a group having the formula: —Ar—$CO_2$—R or —$C_nH_{2n}CO_2$—R where R is an organic group, monomeric group, or a polymeric group. The third type of modified carbon product contains a) a carbon product having attached at least one organic group directly attached to the carbon product, b) at least one ionic group, ionizable group, or a mixture thereof attached to the organic group, and c) at least one counter-ionic group or counter-ionizable group with at least one organic group, monomeric group, or polymeric group, or mixture thereof, where the counter-ionic or counter-ionizable group is attached to the ionic and/or ionizable group. A method of improving the dispersion of carbon products in polymers is also disclosed which involves dispersing the modified carbon products described above in a polymer to form a polymeric product.

U.S. Pat. No. 6,398,858 (Yu et al.), the disclosure of which is totally incorporated herein by reference, discloses a process for preparing surface-modified colored pigments. The process includes the steps of: preparing a reaction batch comprising a treating agent and a diazotizing agent; adding a colored pigment to the batch; and mixing the colored pigment and the batch under high shear conditions to form a reaction product comprising a surface-modified colored pigment. The treating agent has an organic group which comprises at least one diazotizable group. In a preferred embodiment the diazotizable group comprises a) at least one aromatic group or at least one $C_1$-$C_{20}$ alkyl group, and b) at least one ionic group, ionizable group, nonionic group, or a mixture thereof. The surface-modified colored pigments prepared by the process of the invention have been found useful in aqueous or solvent based compositions and particularly in ink jet ink compositions.

U.S. Pat. No. 5,922,118 (Johnson et al.), the disclosure of which is totally incorporated herein by reference, discloses a modified colored pigment which comprises colored pigment having attached at least one organic group. The organic group comprises a) at least one aromatic group or a $C_1$-$C_{12}$ alkyl group and b) at least one ionic group, at least one ionizable group, or a mixture of an ionic group and an ionizable group. The aromatic group or the $C_1$-$C_{12}$ alkyl group of the organic group is directly attached to the pigment and the organic group is present at a treatment level of from about 0.10 to about 4.0 micromoles/m$^2$ of the pigment used based on nitrogen surface area of the pigment. Also described are aqueous and non-aqueous inks and coatings and ink jet ink compositions containing the modified colored pigment. A method to increase the flow of an ink is also disclosed as well as a method to improve the waterfastness of a print imaged by an ink composition. Also, other ink jet ink compositions are described which comprise an aqueous or non-aqueous vehicle and a colored pigment having attached an organic group having the formula: Ar—$R^1$ (I) or Ar'$R^3R^2$ (II) wherein Ar is an aromatic group and Ar' is an aromatic group.

U.S. Pat. No. 5,713,988 (Belmont et al.), the disclosure of which is totally incorporated herein by reference, discloses a non-aqueous coating or ink composition having incorporated therein a modified carbon product comprising carbon having attached a substituted or unsubstituted aromatic group. Also described is a modified carbon product comprising carbon and an attached organic group having a) an aromatic group and b) at least one group of the formula $SO_2NR_2$ or $SO_2NR(COR)$ wherein R is independently hydrogen, a $C_1$-$C_{20}$ substituted or unsubstituted alkyl, a $C_3$-$C_{20}$ substituted or unsubstituted alkenyl, ($C_2$-$C_4$ alkyleneoxy)$_x$R' or a substituted or unsubstituted aryl; R' is hydrogen, a $C_1$-$C_{20}$ substituted or unsubstituted alkyl, a $C_3$-$C_{20}$ substituted or unsubstituted alkenyl, $C_1$-$C_{20}$ substituted or unsubstituted alkanoyl or substituted or unsubstituted aroyl; and x is from 1 to 40.

U.S. Pat. No. 6,506,245 (Kinney et al.), the disclosure of which is totally incorporated herein by reference, discloses colored pigments having one or more desired parameters and/or properties. These parameters and/or properties include: a) a particles size of from about 10 nm to about 300 nm; b) an accusizer number of less than $10^{10}$ particles/ml of dispersion at 15% solids which are greater than 0.5 micron; c) a filterability such that when in a liquid medium, 100 ml having 10% solids of the colored pigment filters through a 3 micron nylon absolute filter; d) a colored pigment purity of greater than about 80%, based on extractable material; and/or e) a stability such that the above-described properties do not change by more than 50% at 25° C. for at least one week. Colored pigments having at least one organic group and having one or more of the above-described characteristics is also described as well as a process for preparing surface-modified colored pigments. The process involves combining at least one treating agent and at least one type of colored pigment(s) in a container to form a mixture and subjecting the mixture to high shearing and introducing at least one diazotizing agent to the mixture at least for a portion of time while the high shearing is taking place, and preferably during the entire time that high shearing is taking place, such that a reaction product is formed and contains surface-modified colored pigment(s).

U.S. Pat. No. 6,177,498 (Rehman), the disclosure of which is totally incorporated herein by reference, discloses a solvent system which aids in start-up, drop ejection, decap and high frequency firing above 10 kHz for inks which contain latex polymers. Two solvents work in conjunction with each other: 3-hexyne-2,5-diol and 1,2-octanediol. These two solvents in combination improve printability in latex polymer-containing ink-jet inks. Such ink-jet inks also include one or more pigments and a vehicle comprising at least one organic, water-miscible solvent and water.

U.S. Pat. No. 6,042,643 (Belmont et al.), the disclosure of which is totally incorporated herein by reference, discloses processes for preparing a carbon black product having an organic group attached to the carbon black. In one process at least one diazonium salt reacts with a carbon black in the absence of an externally applied electric current sufficient to reduce the diazonium salt. In another process at least one diazonium salt reacts with a carbon black in a protic reaction medium. Carbon black products which may be prepared according to process are described as well as uses of such carbon black products in plastic compositions, rubber compositions, paper compositions, and textile compositions.

U.S. Pat. No. 5,900,029 (Belmont et al.), the disclosure of which is totally incorporated herein by reference, discloses processes for coloring a fiber or textile by adding a carbon black product having an organic group attached to the carbon black. In one process at least one diazonium salt reacts with a carbon black in the absence of an externally applied electric current sufficient to reduce the diazonium salt. In another process at least one diazonium salt reacts with a carbon black in a protic reaction medium. Carbon black products which may be prepared according to process are described as well as uses of such carbon black products in plastic compositions, rubber compositions, paper compositions, and textile compositions.

U.S. Pat. No. 5,895,522 (Belmont et al.), the disclosure of which is totally incorporated herein by reference, discloses a modified carbon product which comprises carbon having attached at least one organic group wherein the organic group comprises a) at least one aromatic group or a $C_1$-$C_{12}$ alkyl group, and b) a group having the formula -AG-Sp-LG-Z, wherein AG is an activating group, Sp is a spacer group, LG is a leaving group, and Z is a counterion, and wherein the aromatic or the $C_1$-$C_{12}$ alkyl group is directly attached to the carbon, and wherein the organic group is present in any amount. The present invention also relates to ink and coating compositions comprising these modified carbon products.

U.S. Pat. No. 5,885,335 (Adams et al.), the disclosure of which is totally incorporated herein by reference, discloses a modified carbon product which comprises carbon having attached at least one organic group. The organic group comprises a) at least one aromatic group or a $C_1$-$C_{12}$ alkyl group and b) at least one ionic group, at least one ionizable group, or a mixture of an ionic group and an ionizable group. The aromatic group or the $C_1$-$C_{12}$ alkyl group of the organic group is directly attached to the carbon and the organic group is present at a level of from about 0.10 to about 2.7 micromoles/m$^2$ of the carbon used based on CTAB or t-area of the carbon or in an amount such that the modified carbon product has a residue value of more than about 5 weight percent. Also described are aqueous and non-aqueous inks and coatings containing the modified carbon product. A method to increase the flow of an ink, as measured by glass plate flow, by incorporating the modified carbon product as part of the ink is also disclosed. Lastly, non-aqueous ink and coating formulations are described which contain an appropriate solvent and a modified carbon product comprising carbon having attached at least one organic group, wherein the organic group comprises a) at least one aromatic group or $C_1$-$C_{12}$ alkyl group, and b) at least one ionic group, at least one ionizable group, or a mixture of an ionic group and an ionizable group, wherein the organic group is present in any amount.

U.S. Pat. No. 5,851,280 (Belmont et al.), the disclosure of which is totally incorporated herein by reference, discloses processes for preparing a carbon black product having an organic group attached to the carbon black. In one process at least one diazonium salt reacts with a carbon black in the absence of an externally applied electric current sufficient to reduce the diazonium salt. In another process at least one diazonium salt reacts with a carbon black in a protic reaction medium. Carbon black products which may be prepared according to process are described as well as uses of such carbon black products in plastic compositions, rubber compositions, paper compositions, and textile compositions.

U.S. Pat. No. 5,837,045 (Johnson et al.), the disclosure of which is totally incorporated herein by reference, discloses a surface-modified colored pigment which includes a colored pigment having no primary amines and at least one attached hydrophilic organic group, wherein said organic group comprises a) at least one aromatic group, and b) at least one ionic group or ionizable group, or a mixture of an ionic group or an ionizable group. The colored pigment may be blue, brown, cyan, green, violet, magenta, red, orange, yellow, mixtures thereof and the like. The surface-modified colored pigment, due to the hydrophilic groups on its surface, is readily dispersed in a liquid vehicle without the addition of a surfactant or other dispersing aid or additive. The surface-modified color pigment may be used in a variety of aqueous systems including, but not limited to, coatings, paints, papers, adhesives, latexes, inks, toners, textiles and fibers. In addition, an aqueous composition is disclosed including water-based liquid vehicle and the surface-modified colored pigment described above. Also disclosed is an ink composition including a water-based liquid vehicle and the surface-modified colored pigment described above. Finally, a process is disclosed for preparing the surface-modified colored pigments having no primary amines and at least one attached hydrophilic organic group, wherein said organic group comprises a) at least one aromatic group, and b) at least one ionic or ionizable group, or a mixture of an ionic group or an ionizable group.

U.S. Pat. No. 5,803,959 (Johnson et al.), the disclosure of which is totally incorporated herein by reference, discloses a modified carbon product which comprises carbon having attached at least one organic group. The organic group comprises a) at least one aromatic group or a $C_1$-$C_{12}$ alkyl group and b) at least one ionic group, at least one ionizable group, or a mixture of an ionic group and an ionizable group. The aromatic group or the $C_1$-$C_{12}$ alkyl group of the organic group is directly attached to the carbon and the organic group is present at a level of from about 0.10 to about 4.0 micromoles/m$^2$ of the carbon used based on nitrogen surface area of the carbon. Also described are aqueous and non-aqueous inks and coatings and ink jet ink compositions containing the modified carbon product. A method to increase the flow of an ink, as measured by glass plate flow, by incorporating the modified carbon product as part of the ink is also disclosed as well as a method to improve the waterfastness of a print imaged by an ink composition. Lastly, non-aqueous ink and coating formulations are described which contain an appropriate solvent and a modified carbon product comprising carbon having attached at least one organic group, wherein the organic group comprises a) at least one aromatic group or $C_1$-$C_{12}$ alkyl group, and b) at least one ionic group, at least one ionizable group, or a mixture of an ionic group and an ionizable group, wherein the organic group is present in any amount.

U.S. Pat. No. 5,707,432 (Adams et al.), the disclosure of which is totally incorporated herein by reference, discloses a modified carbon product which comprises carbon having attached at least one organic group. The organic group comprises a) at least one aromatic group or a $C_1$-$C_{12}$ alkyl group and b) at least one ionic group, at least one ionizable group, or a mixture of an ionic group and an ionizable group. The aromatic group or the $C_1$-$C_{12}$ alkyl group of the organic group is directly attached to the carbon and the organic group is present at a level of from about 0.10 to about 2.5 micromoles/m$^2$ of the carbon used based on CTAB or t-area of the carbon or in an amount such that the modified carbon product has a residue value of more than about 5 weight percent. Also described are aqueous and non-aqueous inks and coatings containing the modified carbon product. A method to increase the flow of an ink, as measured by glass plate flow, by incorporating the modified carbon product as part of the ink is also disclosed. Lastly, non-aqueous ink and coating formulations are described which contain an appropriate solvent and a modified carbon product comprising carbon having attached at least one organic group, wherein the organic group comprises a) at least one aromatic group or $C_1$-$C_{12}$ alkyl group, and b) at least one ionic group, at least one ionizable group, or a mixture of an ionic group and an ionizable group, wherein the organic group is present in any amount.

U.S. Pat. No. 5,698,016 (Adams et al.), the disclosure of which is totally incorporated herein by reference, discloses a composition which comprises a) an amphiphilic ion, and b) a modified carbon product comprising carbon having attached at least one organic group. The organic group has a charge opposite to the amphiphilic ion. Also disclosed are aqueous and non-aqueous ink and coating compositions incorporating this composition. Ink jet ink compositions are further described incorporating this composition.

U.S. Pat. No. 5,672,198 (Belmont), the disclosure of which is totally incorporated herein by reference, discloses aqueous ink compositions which include a modified carbon product comprising a carbon having attached at least one organic group that is substituted with an ionic or an ionizable group. A coating composition is also described and comprises water, a binder, and a modified carbon product having at least one organic group attached to carbon wherein the organic group is substituted with an ionic or an ionizable group.

U.S. Pat. No. 5,630,868 (Belmont et al.), the disclosure of which is totally incorporated herein by reference, discloses an aqueous ink jet ink composition comprising an aqueous vehicle and a modified carbon product containing carbon having attached at least one organic group. The organic group comprises a) at least one aromatic group and b) at least one ionic group, at least one ionizable group, or a mixture of an ionic group and an ionizable group. The organic group having an aromatic group is directly attached to the carbon by the aromatic group. The organic group may comprise a) at least one $C_1$-$C_{12}$ alkyl group and b) at least one ionic group, at least one ionizable group, or a mixture of an ionic group and an ionizable group. Ink jet recording methods applying an ink jet ink of the present invention are also described.

U.S. Pat. No. 5,571,311 (Belmont et al.), the disclosure of which is totally incorporated herein by reference, discloses an aqueous ink jet ink composition comprising an aqueous vehicle and a carbon black product having attached at least one organic group. The organic group comprises a) at least one aromatic group and b) at least one ionic group, at least one ionizable group, or a mixture of an ionic group and an ionizable group. The organic group is directly attached to the carbon black by an aromatic group. Also disclosed is an aqueous ink jet ink composition comprising an aqueous vehicle and a carbon black product having attached at least one organic group. The organic group comprises a) at least one $C_1$-$C_{12}$ alkyl group and b) at least one ionic group, at least one ionizable group, or a mixture of an ionic group and an ionizable group. The organic group is directly attached to the carbon black by an alkyl group. Ink jet recording methods applying an ink jet ink of the present invention are also described.

U.S. Pat. No. 5,554,739 (Belmont), the disclosure of which is totally incorporated herein by reference, discloses processes for preparing a carbon product having an organic group attached to a carbon material. The carbon material is selected from graphite powder, a graphite fiber, a carbon fiber, a carbon cloth, a vitreous carbon product, and an activated carbon product. In one process at least one diazonium salt reacts with a carbon material in the absence of an externally applied electric current sufficient to reduce the diazonium salt. In another process at least one diazonium salt reacts with a carbon material in a protic reaction medium.

U.S. Pat. No. 5,281,261 (Lin), the disclosure of which is totally incorporated herein by reference, discloses an ink composition comprising an aqueous liquid vehicle and pigment particles having attached to the surfaces thereof a polymerized vinyl aromatic salt. In one embodiment, the polymeric vinyl aromatic salt is chemically grafted to the surfaces of the pigment particles; in another embodiment, the polymeric vinyl aromatic salt is adsorbed onto the surfaces of the pigment particles. Preferably, the modified pigment particles have an average particle diameter of less than about 1 micron. The ink composition is suitable for applications such as ink jet printing processes, particularly thermal ink jet printing processes. Images generated with ink compositions of the present invention are sharp, waterfast, lightfast, and of high optical density, exhibiting no feathering, and can be electrically conductive.

U.S. Pat. No. 5,184,148 (Suga et al.), the disclosure of which is totally incorporated herein by reference, discloses an ink comprising an aqueous liquid medium which contains acid carbon black having a volatile content within the range of 3.5 to 8 percent by weight and a water-soluble resin having a weight average molecular weight within the range of 3,000 to 30,000, wherein the weight ratio of the acid carbon black to the water-soluble resin is within the range of 3:1 to 10:1. Also disclosed are an ink jet recording method, an ink jet device, an ink cartridge, and an ink jet recording apparatus which uses the ink.

U.S. Pat. No. 4,530,961 (Nguyen et al.), the disclosure of which is totally incorporated herein by reference, discloses aqueous dispersion of carbon black grafted with hydrophilic monomers such as alkali or ammonium carboxylate bearing polymers. The dispersion has a viscosity of about 2 to about 30 cP for a carbon black content of about 1 to 15 percent by weight.

EP 0 797 635 B1 (Belmont et al.), the disclosure of which is totally incorporated herein by reference, discloses a non-aqueous coating or ink composition having incorporated therein a modified carbon product comprising carbon having attached a substituted or unsubstituted aromatic group. Also described is a modified carbon product comprising carbon and an attached organic group having a) an aromatic group and b) at least one group of the formula $SO_2NR_2$ or $SO_2NR(COR)$ wherein R is independently hydrogen, a $C_1$-$C_{20}$ substituted or unsubstituted alkyl, a $C_3$-$C_{20}$ substituted or unsubstituted alkenyl, $(C_2$-$C_4$ alkyleneoxy$)_xR'$ or a substituted or unsubstituted aryl; R' is hydrogen, a $C_1$-$C_{20}$ substituted or unsubstituted alkyl, a $C_3$-$C_{20}$ substituted or unsubstituted alkenyl, $C_1$-$C_{20}$ substituted or unsubstituted alkanoyl or substituted or unsubstituted aroyl: and x is from 1 to 40.

EP 0 797 636 B1 (Belmont et al.), the disclosure of which is totally incorporated herein by reference, discloses an aqueous ink jet ink composition comprising an aqueous vehicle and a modified carbon product containing carbon having attached at least one organic group. The organic group comprises a) at least one aromatic group and b) at least one ionic group, at least one ionizable group, or a mixture of an ionic group and an ionizable group. The organic group having an aromatic group is directly attached to the carbon by the aromatic group. The organic group may comprise a) at least one $C_1$-$C_{12}$ alkyl group and b) at least one ionic group, at least one ionizable group, or a mixture of an ionic group and an ionizable group. Ink jet recording methods applying an ink jet ink of the invention are also described.

EP 1 220 879 B1 (Belmont), the disclosure of which is totally incorporated herein by reference, discloses various modified pigment products which are preferably capable of being dispersed in a variety of materials such as coatings, inks, toners, films, plastics, polymers, elastomers, and the like. The modified pigments are pigments having attached a) at least one steric group and b) at least one organic ionic group and at least one amphiphilic counterion, wherein the amphiphilic counterion has a charge opposite to that of the organic ionic group. In addition, inks, coatings, toners, films, plastics, polymers, elastomers, and the like containing the modified pigment products of the invention are described. Methods of making the modified pigment products are also described.

EP 1 007 595 B1 (Belmont et al.), the disclosure of which is totally incorporated herein by reference, discloses a modified carbon product which comprises carbon having attached at least one organic group wherein the organic group comprises a) at least one aromatic group or a $C_1$-$C_{12}$ alkyl group, and b) a group having the formula -AG-Sp-LG-Z, wherein AG is an activating group, Sp is a spacer group, LG is a leaving group, and Z is a counterion, and wherein the aromatic or the $C_1$-$C_{12}$ alkyl group is directly attached to the carbon, and wherein the organic group is present in any amount. The invention also relates to ink and coating compositions comprising these modified carbon products.

EP 0 910 611 B1 (Adams et al.), the disclosure of which is totally incorporated herein by reference, discloses a modified carbon product which comprises carbon having attached at least one organic group. The organic group comprises a) at least one aromatic group or a $C_1$-$C_{12}$ alkyl group and b) at least one ionic group, at least one ionizable group, or a mixture of an ionic group and an ionizable group. The aromatic group or the $C_1$-$C_{12}$ alkyl group of the organic group is directly attached to the carbon and the organic group is present at a level of from about 0.10 to about 2.5 micromoles/m$^2$ of the carbon used based on CTAB or t-area of the carbon or in an amount such that the modified carbon product has a residue value of more than about 5 wt %. Also described are aqueous and non-aqueous inks and coatings containing the modified carbon product. A method to increase the flow of an ink, as measured by glass plate flow, by incorporating the modified carbon product as part of the ink is also disclosed. Lastly, non-aqueous ink and coating formulations are described which contain an appropriate solvent and a modified carbon product comprising carbon having attached at least one organic group, wherein the organic group comprises a) at least one aromatic group or $C_1$-$C_{12}$ alkyl group, and b) at least one ionic group, at least one ionizable group, or a mixture of an ionic group and an ionizable group, wherein the organic group is present in any amount.

PCT Patent Publication WO 96/18688 (Belmont et al.), the disclosure of which is totally incorporated herein by reference, discloses processes for preparing a carbon black product having an organic group attached to the carbon black. In one process at least one diazonium salt reacts with a carbon black in the absence of an externally applied electric current sufficient to reduce the diazonium salt. In another process at least one diazonium salt reacts with a carbon black in a protic reaction medium. Carbon black products which may be prepared according to the process are described as well as uses of such carbon black products in plastic compositions, rubber compositions, paper compositions, and textile compositions.

PCT Patent Publication WO 92/13983 (Pinson et al.), the disclosure of which is totally incorporated herein by reference, discloses a process for modifying the surface of carbon-containing materials by electrochemical reduction of diazonium salts, applicable in particular to carbon fibres for composite materials, and carbon-containing materials so modified. According to the process, the carbon-containing material is used as a cathode in an electrolysis unit containing a diazonium salt solution $ArN_2x^-$ in an aprotic solvent and by electrochemical reduction to a suitable potential, the aromatic group (Ar) is bound to the carbon-containing material. Any aromatic group can be bound in this way to the carbon-containing material, for instance $C_6H_4NO_2$, $C_6H_4NH_2$, $C_6H_4COOH$, and then reacted with suitable compounds.

PCT Patent Publication WO 91/15425 (Medalia et al.), the disclosure of which is totally incorporated herein by reference, discloses carbon blacks treated with a treating agent comprising at least one compound containing at least one long chain alkenyl or alkyl group and at least one amine group. Optionally, the compound contains at least one chemical group for linking the long chain alkenyl or alkyl group with the amine group. Also disclosed are ink compositions incorporating the treated carbon blacks and processes for preparing the compositions.

PCT Patent Publication WO 96/18690 (Belmont), the disclosure of which is totally incorporated herein by reference, discloses processes for preparing a carbon product having an organic group attached to a carbon material. The carbon material is selected from graphite powder, a graphite fiber, a carbon fiber, a carbon cloth, a vitreous carbon product, and an activated carbon product. In one process at least one diazonium salt reacts with a carbon material in the absence of an externally applied electric current sufficient to reduce the diazonium salt. In another process at least one diazonium salt reacts with a carbon material in a protic reaction medium.

U.S. Pat. No. 6,110,264 (Banning et al.), the disclosure of which is totally incorporated herein by reference, discloses a phase change ink carrier composition comprising at least one anhydride/alcohol inclusive reaction product.

U.S. Pat. No. 6,048,925 (Titterington et al.), the disclosure of which is totally incorporated herein by reference, discloses urethane resins made by reacting selected nucleophiles, including alcohols, with an isocyanate. The order of addition of the isocyanate and the different nucleophiles can tailor the distribution of mixed urethane molecules in the final resin product. The final resin product can be colored or uncolored and include a toughening agent. The isocyanate-derived resin materials are useful as ingredients as phase change ink carrier compositions used to make phase change ink jet inks.

U.S. Pat. No. 5,019,166 (Schwarz), the disclosure of which is totally incorporated herein by reference, discloses a thermal ink jet printing composition comprising a dye, a liquid medium, and a surfactant selected from the group consisting of polyoxyalkylated ethers, anionic bitail fluorothio alkyls, alkyl aryl sulfonates, alkyl amine quaternary salts, and mixtures thereof. Also disclosed is a process for generating images which comprises causing the ink compositions disclosed herein to be ejected from a thermal ink jet printer in imagewise fashion onto a substrate.

U.S. Pat. No. 5,626,654 (Breton et al.), the disclosure of which is totally incorporated herein by reference, discloses an ink composition which comprises an aqueous liquid vehicle, a dye, and a vesicle-forming lipid, wherein vesicles of the lipid are present in the ink.

U.S. Pat. No. 5,633,109 (Jennings et al.), the disclosure of which is totally incorporated herein by reference, discloses an ink composition which comprises an aqueous liquid vehicle, a photochromic material, and a vesicle-forming lipid, wherein vesicles of the lipid are present in the ink.

U.S. Pat. No. 5,053,079 (Haxell et al.), the disclosure of which is totally incorporated herein by reference, discloses a dispersed, pigmented hot melt ink containing a thermoplastic vehicle, a colored pigment, and a dispersing agent to inhibit settling or agglomeration of pigment when the ink is molten comprising an isocyanate-modified microcrystalline wax or lignite wax in an amount of 2 to 100 weight percent of the weight of the vehicle. Preferred is the isocyanate-modified microcrystalline wax marketed as Petrolite WB17.

H. Kunieda et al., "Formation of Reversed Vesicles," *J. Am. Chem. Soc.*, 1991, 113, 1051-1052, the disclosure of which is totally incorporated herein by reference, discloses reversed or inverted vesicles in solutions of the nonionic surfactant tetraethylene glycol dodecyl ether in dodecane containing a small amount of water.

While known compositions and processes are suitable for their intended purposes, a need remains for improved phase change inks. In addition, a need remains for phase change inks having pigment colorants. Further, a need remains for phase change inks having pigment colorants wherein the pigment particles are stable and uniformly dispersed within the ink formulation. Additionally, a need remains for phase change inks having improved lightfastness. A need also remains for phase change inks that generate images of desirably high optical density. In addition, a need remains for phase change inks with the aforementioned advantages which can be prepared by energy-efficient processes. Further, a need remains for phase change inks with the aforementioned advantages which can be prepared without the need for high shear mixing. Additionally, a need remains for phase change inks that can generate high optical density images without the need for excessively high concentrations of colorant.

SUMMARY

Disclosed herein is a phase change ink composition comprising (a) an ink carrier comprising (1) a polyalkylene wax and (2) a component selected from the group consisting of (A) amides, (B) esters, (C) ester-amides, (D) urethanes, (E) ureas, (F) urethane-ureas, and (G) mixtures thereof, and (b) pigment particles having hydrophobic functional groups covalently bonded to the surfaces thereof, said ink composition having a melting point no lower than about 40° C., said ink composition having a melting point no higher than about 160° C.

DETAILED DESCRIPTION

The inks disclosed herein comprise an ink carrier and pigment particles having hydrophobic functional groups covalently bonded to the surfaces thereof.

Examples of suitable ink carrier materials include fatty amides, such as monoamides, tetra-amides, mixtures thereof, and the like. In one specific embodiment, the amide is a resin or a wax or a mixture thereof. Suitable monoamides include both solid and liquid monoamides, provided that the ink containing the mixture of all ingredients is solid at room temperature (typically from about 20 to about 25° C.). In one specific embodiment, the monoamide has a melting point of at least about 40° C., although the melting point can be below this temperature. In another specific embodiment, the monoamide has a melting point of no more than about 100° C., although the melting point can be above this temperature. Some specific examples of suitable monoamides include (but are not limited to) primary monoamides and secondary monoamides. Stearamide, such as KEMAMIDE S available from Witco Chemical Company and CRODAMIDE S available from Croda, behenamide, such as KEMAMIDE B available from Witco and CRODAMIDE BR available from Croda, oleamide, such as KEMAMIDE U available from Witco and CRODAMIDE OR available from Croda, technical grade oleamide, such as KEMAMIDE O available from Witco, CRODAMIDE O available from Croda, and UNISLIP 1753 available from Uniqema, and erucamide such as KEMAMIDE E available from Witco and CRODAMIDE ER available from Croda, are some examples of suitable primary amides. Behenyl behenamide, such as KEMAMIDE EX666 available from Witco, stearyl stearamide, such as KEMAMIDE S-180 and KEMAMIDE EX-672 available from Witco, stearyl erucamide, such as KEMAMIDE E-180 available from Witco and CRODAMIDE 212 available from Croda, erucyl erucamide, such as KEMAMIDE E-221 available from Witco, oleyl palmitamide, such as KEMAMIDE P-181 available from Witco and CRODAMIDE 203 available from Croda, and erucyl stearamide, such as KEMAMIDE S-221 available from Witco, are some examples of suitable secondary amides. In one specific embodiment, the monoamide is of the formula

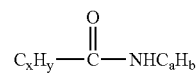

wherein x is an integer of from about 5 to about 21, y is an integer of from about 11 to about 43, a is an integer of from about 6 to about 22, and b is an integer of from about 13 to about 45. In one specific embodiment, the monoamide is of the formula

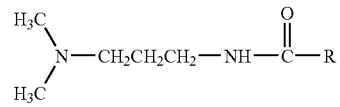

wherein R is a long chain hydrocarbon with from about 12 to about 48 carbon atoms and with an average of about 30 carbon atoms. Materials of this formula are commercially available as, for example, X-5181 from Petrolite. In another specific embodiment, the monoamide is of the formula

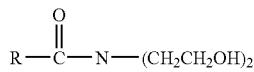

wherein R is a long chain hydrocarbon with from about 12 to about 48 carbon atoms and with an average of about 20 carbon atoms. Materials of this formula are commercially available as, for example, X-5319 from Petrolite. Mixtures of two or more monoamides can also be present in the ink.

When present, the monoamide is present in the ink carrier in any desired or effective amount, in one specific embodiment at least about 8 percent by weight, in another embodiment at least about 10 percent by weight, and in yet another embodiment at least about 12 percent by weight, and in one embodiment no more than about 70 percent by weight, in another embodiment no more than about 60 percent by weight, in yet another embodiment no more than about 50 percent by weight, in still another embodiment no more than about 32 percent by weight, in another embodiment no more than about 28 percent by weight, and in yet another embodiment no more than about 25 percent by weight, although the amount can be outside of these ranges.

Suitable tetra-amides include both solid and liquid tetra-amides, provided that the ink containing the mixture of all ingredients is solid at room temperature (typically from about 20 to about 25° C.). One specific class of suitable tetra-amides is that encompassed by the formula

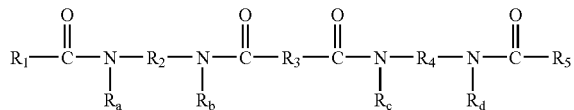

wherein $R_a$, $R_b$, $R_c$, and $R_d$ each, independently of the others, is (a) a hydrogen atom, (b) an alkyl group (including linear, branched, saturated, unsaturated, cyclic, substituted, and unsubstituted alkyl groups, and wherein hetero atoms, such as oxygen, nitrogen, sulfur, silicon, phosphorus, and the like either may or may not be present in the alkyl group), in one embodiment with at least 1 carbon atom, in another embodiment with at least about 2 carbon atoms, in yet another embodiment with at least about 4 carbon atoms, and in still another embodiment with at least about 8 carbon atoms, and in one embodiment with no more than about 100 carbon atoms, and in another embodiment with no more than about 50 carbon atoms, although the number of carbon atoms can be outside of these ranges, (c) an aryl group (including unsubstituted and substituted aryl groups, and wherein hetero atoms, such as oxygen, nitrogen, sulfur, silicon, phosphorus, and the like either may or may not be present in the aryl group), in one embodiment with at least about 5 carbon atoms, and in another embodiment with at least about 6 carbon atoms, and in one embodiment with no more than about 100 carbon atoms, and in another embodiment with no more than about 50 carbon atoms, although the number of carbon atoms can be outside of these ranges, (d) an arylalkyl group (including unsubstituted and substituted arylalkyl groups, wherein the alkyl portion of the arylalkyl group can be linear, branched, saturated, unsaturated, and/or cyclic, and wherein hetero atoms, such as oxygen, nitrogen, sulfur, silicon, phosphorus, and the like either may or may not be present in either or both of the alkyl portion and the aryl portion of the arylalkyl group), in one embodiment with at least about 6 carbon atoms, and in another embodiment with at least about 7 carbon atoms, and in one embodiment with no more than about 100 carbon atoms, and in another embodiment with no more than about 50 carbon atoms, although the number of carbon atoms can be outside of these ranges, such as benzyl or the like, or (e) an alkylaryl group (including unsubstituted and substituted alkylaryl groups, wherein the alkyl portion of the alkylaryl group can be linear, branched, saturated, unsaturated, and/or cyclic, and wherein hetero atoms, such as oxygen, nitrogen, sulfur, silicon, phosphorus, and the like either may or may not be present in either or both of the alkyl portion and the aryl portion of the alkylaryl group), in one embodiment with at least about 6 carbon atoms, and in another embodiment with at least about 7 carbon atoms, and in one embodiment with no more than about 100 carbon atoms, and in another embodiment with no more than about 50 carbon atoms, although the number of carbon atoms can be outside of these ranges, such as tolyl or the like, wherein $R_2$, $R_3$, and $R_4$ each, independently of the others, are (a) an alkylene group (including linear, branched, saturated, unsaturated, cyclic, substituted, and unsubstituted alkylene groups, and wherein hetero atoms, such as oxygen, nitrogen, sulfur, silicon, phosphorus, and the like either may or may not be present in the alkylene group), in one embodiment with at least 1 carbon atom, in another embodiment with at least about 2 carbon atoms, in yet another embodiment with at least about 4 carbon atoms, and in still another embodiment with at least about 8 carbon atoms, and in one embodiment with no more than about 100 carbon atoms, in another embodiment with no more than about 50 carbon atoms, and in yet another embodiment with no more than about 12 carbon atoms, although the number of carbon atoms can be outside of these ranges, (b) an arylene group (including unsubstituted and substituted arylene groups, and wherein hetero atoms, such as oxygen, nitrogen, sulfur, silicon, phosphorus, and the like either may or may not be present in the arylene group), in one embodiment with at least about 5 carbon atoms, and in another embodiment with at least about 6 carbon atoms, and in one embodiment with no more than about 100 carbon atoms, in another embodiment with no more than about 50 carbon atoms, and in yet another embodiment with no more than about 12 carbon atoms, although the number of carbon atoms can be outside of these ranges, (c) an arylalkylene group (including unsubstituted and substituted arylalkylene groups, wherein the alkyl portion of the arylalkylene group can be linear, branched, saturated, unsaturated, and/or cyclic, and wherein hetero atoms, such as oxygen, nitrogen, sulfur, silicon, phosphorus, and the like either may or may not be present in either or both of the alkyl portion and the aryl portion of the arylalkylene group), in one embodiment with at least about 6 carbon atoms, and in another embodiment with at least about 7 carbon atoms, and in one embodiment with no more than about 100 carbon atoms, in another embodiment with no more than about 50 carbon atoms, and in yet another embodiment with no more than about 12 carbon atoms, although the number of carbon atoms can be outside of these ranges, or (d) an alkylarylene group (including unsubstituted and substituted alkylarylene groups, wherein the alkyl portion of the alkylarylene group can be linear, branched, saturated, unsaturated, and/or cyclic, and wherein hetero atoms, such as oxygen, nitrogen, sulfur, silicon, phosphorus, and the like either may or may not be present in either or both of the alkyl portion and the aryl portion of the alkylarylene group), in one embodiment with at least about 6 carbon atoms, and in another embodiment with at least about 7 carbon atoms, and in one embodiment with no more than about 100 carbon atoms, in another embodiment with no more than about 50 carbon atoms, and in yet another embodiment with no more than about 12 carbon atoms, although the number of carbon atoms can be outside of these ranges, and wherein $R_1$ and $R_5$ each, independently of the other, is (a) an alkyl group (including linear, branched, saturated, unsaturated, cyclic, substituted, and unsubstituted alkyl groups, and wherein hetero atoms, such as oxygen, nitrogen, sulfur, silicon, phosphorus, and the like either may or may not be present in the alkyl group), in one embodiment with at least 1 carbon atom, in another embodiment with at least about 2 carbon atoms, in yet another embodiment with at least about 4 carbon atoms, in still another embodiment with at least about 8 carbon atoms, in another embodiment with at least about 12 carbon atoms, in yet another embodiment with at least about 18 carbon atoms, in still another embodiment with at least about 37 carbon atoms, in another embodiment with at least about 40 carbon atoms, and in yet another embodiment with at least about 48 carbon atoms, and in one embodiment with no more than about 100 carbon atoms, and in another embodiment with no more than about 50 carbon atoms, although the number of carbon atoms can be outside of these ranges, (b) an aryl group (including unsubstituted and substituted aryl groups, and wherein hetero atoms, such as oxygen, nitrogen, sulfur, silicon, phosphorus, and the like either may or may not be present in the aryl group), in one embodiment with at least about 5 carbon atoms, in another embodiment with at least about 6 carbon atoms, in another embodiment with at least about 12 carbon atoms, in yet another embodiment with at least about 18 carbon atoms, in still another embodiment with at least about 37 carbon atoms, in another embodiment with at least about 40 carbon atoms, and in yet another embodiment with at least about 48 carbon atoms, and in one embodiment with no more than about 100 carbon atoms, and in another embodiment with no more than about 50 carbon atoms, although the number of carbon atoms can be outside of these ranges, (c) an arylalkyl group (including unsubstituted and substituted arylalkyl groups, wherein the alkyl portion of the arylalkyl group can be linear, branched, saturated, unsaturated, and/or cyclic, and wherein hetero atoms, such as oxygen, nitrogen, sulfur, silicon, phosphorus, and the like either may or may not be present in either or both of the alkyl portion and the aryl portion of the arylalkyl group), in one embodiment with at least about 6 carbon atoms, in another embodiment with at least about 7 carbon atoms, in another embodiment with at least about 12 carbon atoms, in yet another embodiment with at least about 18 carbon atoms, in still another embodiment with at least about 37 carbon atoms, in another embodiment with at least about 40 carbon atoms, and in yet another embodiment with at least about 48 carbon atoms, and in one embodiment with no more than about 100 carbon atoms, and in another embodiment with no more than about 50 carbon atoms, although the number of carbon atoms can be outside of these ranges, such as benzyl or the like, or (d) an alkylaryl group (including unsubstituted and substituted alkylaryl groups, wherein the alkyl portion of the alkylaryl group can be linear, branched, saturated, unsaturated, and/or cyclic, and wherein hetero atoms, such as oxygen, nitrogen, sulfur, silicon, phosphorus, and the like either may or may not be present in either or both of the alkyl portion and the aryl portion of the alkylaryl group), in one embodiment with at least about 6 carbon atoms, in another embodiment with at least about 7 carbon atoms, in another embodiment with at least about 12 carbon atoms, in yet another embodiment with at least about 18 carbon atoms, in still another embodiment with at least about 37 carbon atoms, in another embodiment with about 40 carbon atoms, and in yet another embodiment with at least about 48 carbon atoms, and in one embodiment with no more than about 100 carbon atoms, and in another embodiment with no more than about 50 carbon atoms, although the number of carbon atoms can be outside of these ranges, such as tolyl or the like, wherein the substituents on the substituted alkyl, aryl, arylalkyl, alkylaryl, alkylene, arylene, arylalkylene, and alkylarylene groups can be (but are not limited to) hydroxy groups, halogen atoms, amine groups, imine groups, ammonium groups, cyano groups, pyridine groups, pyridinium groups, ether groups, aldehyde groups, ketone groups, ester groups, amide groups, carbonyl groups, thiocarbonyl groups, sulfate groups, sulfonate groups, sulfide groups, sulfoxide groups, phosphine groups, phosphonium groups, phosphate groups, nitrile groups, mercapto groups, nitro groups, nitroso groups, sulfone groups, acyl groups, acid anhydride groups, azide groups, azo groups, cyanato groups, isocyanato groups, thiocyanato groups, isothiocyanato groups, carboxylic acid groups, mixtures thereof, and the like, wherein two or more substituents can be joined together to form a ring. In one specific embodiment, one or both of $R_1$ and $R_5$ are alkyl groups with about 18 carbon atoms. In another specific embodiment, one or both of $R_1$ and $R_5$ are alkyl groups with at least about 37 carbon atoms. In yet another specific embodiment, one or both of $R_1$ and $R_5$ are alkyl groups with about 48 carbon atoms. In still another specific embodiment, $R_1$ and $R_5$ are both —$(CH_2)_{16}CH_3$, $R_2$ and $R_4$ are each —$CH_2CH_2$—, and $R_3$ is a branched unsubstituted alkyl group having about 34 carbon atoms. In another specific embodiment, $R_1$ and $R_5$ are both —$(CH_2)_nCH_3$ wherein n is 47 or 48, $R_2$ and $R_4$ are each —$CH_2CH_2$—, and $R_3$ is a branched unsubstituted alkyl group having about 34 carbon atoms.

Tetra-amides can be prepared as disclosed in, for example, U.S. Pat. No. 6,174,937, the disclosure of which is totally incorporated herein by reference. One specific example of a suitable tetra-amide is a tetra-amide resin obtained from the reaction of one equivalent of a C-36 dimer acid obtained from Uniqema, New Castle, Del. with two equivalents of ethylene diamine and UNICID® 700 (obtained from Baker Petrolite, Tulsa, Okla., a long chain hydrocarbon having a terminal carboxylic acid group), prepared as described in Example 1 of U.S. Pat. No. 6,174,937, the disclosure of which is totally incorporated herein by reference.

When present, the tetra-amide is present in the ink carrier in any desired or effective amount, in one specific embodiment at least about 10 percent by weight, in another embodiment at least about 13 percent by weight, and in yet another embodiment at least about 16 percent by weight, and in one embodiment no more than about 32 percent by weight, in another embodiment no more than about 27 percent by weight, and in yet another embodiment no more than about 22 percent by weight, although the amount can be outside of these ranges.

Further information on fatty amide carrier materials is disclosed in, for example, U.S. Pat. Nos. 4,889,560, 4,889,761, 5,194,638, 4,830,671, 6,174,937, 5,372,852, 5,597,856, 6,174,937, and British Patent GB 2 238 792, the disclosures of each of which are totally incorporated herein by reference.

Also suitable as components in the phase change ink carrier are isocyanate-derived resins and waxes, such as urethane isocyanate-derived materials, urea isocyanate-derived materials, urethane/urea isocyanate-derived materials, mixtures thereof, and the like. One specific example of a suitable isocyanate-derived material is a urethane resin derived from the reaction of two equivalents of hydroabietyl alcohol and one equivalent of isophorone diisocyanate. Materials of this kind can be prepared as described in, for example, Example 1 of U.S. Pat. No. 5,782,966, the disclosure of which is totally incorporated herein by reference. Another specific example of a suitable isocyanate-derived material is a material that is the adduct of three equivalents of stearyl isocyanate and a glycerol propoxylate such as ARCOL® LHT. Materials of this kind can be prepared as described in, for example, Example 4 of U.S. Pat. No. 6,309,453, the disclosure of which is totally incorporated herein by reference. Yet another specific example of a suitable isocyanate-derived material is a material that is the product of the reaction of about 1.5 parts hydroabietyl alcohol, about 0.5 part octadecyl amine, and about 1 part isophorone diisocyanate. Materials of this kind can be prepared as described in, for example, Example 2 of Copending application U.S. Ser. No. 08/672,816, the disclosure of which is totally incorporated herein by reference. Also suitable are urethane and urea adducts of oxidized polyethylene waxes. For example, urethanes of the general formula shown can be generated as indicated:

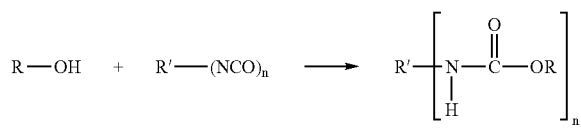

wherein R is $CH_3CH_2(CH_2-CH_2)_m$, m is from about 12 to about 106, and n is 1 or 2. Ureas of the general formula shown can be generated as indicated:

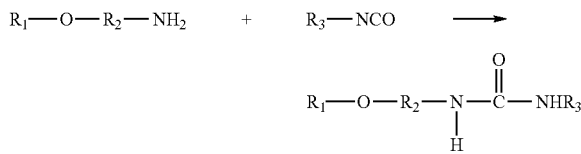

wherein $R_1$ is $CH_3CH_2(CH_2-CH_2)_m$, m is from about 12 to about 106, $R_2$ is a straight or branched alkyl chain, $R_3$ is $CH_3CH_2(CH_2-CH_2)_n$, and n is from about 12 to about 106. Materials of these kinds are available from, for example, Baker Petrolite as WB-5, with a molecular weight of 650, polydispersity of 1.7, acid number of 16, and melting point of 89° C., and as WB-17, with a molecular weight of 730, polydispersity of 1.8, acid number of 2, and melting point of 74° C. Further information on isocyanate-derived carrier materials is disclosed in, for example, U.S. Pat. Nos. 5,750,604, 5,780,528, 5,782,966, 5,783,658, 5,827,918, 5,830,942, 5,919,839, 6,048,925, 6,110,264, 6,255,432, 6,309,453, 5,053,079, British Patent GB 2 294 939, British Patent GB 2 305 928, British Patent GB 2 305 670, British Patent GB 2 290 793, PCT Publication WO 94/14902, PCT Publication WO 97/12003, PCT Publication WO 97/13816, PCT Publication WO 96/14364, PCT Publication WO 97/33943, and PCT Publication WO 95/04760, the disclosures of each of which are totally incorporated herein by reference.

When present, the isocyanate-derived material(s) is present in the ink carrier in any desired or effective amount, in one embodiment at least about 8 percent by weight of the ink carrier, in another embodiment of at least about 11 percent by weight of the ink carrier, and in yet another embodiment of at least about 14.5 percent by weight of the ink carrier, and in one embodiment of no more than about 29 percent by weight of the ink carrier, in another embodiment of no more than about 24 percent by weight of the ink carrier, and in yet another embodiment of no more than about 19.5 percent by weight of the ink carrier, although the amount can be outside of these ranges.

Also suitable as components in the phase change ink carrier are ester resins and waxes and ester-amide resins and waxes. Further information on such materials is disclosed in, for example, U.S. Pat. Nos. 5,863,319, 5,783,657, 5,645,632, 5,194,638, 4,066,585, and Copending application U.S. Ser. No. 10/881,047, the disclosures of each of which are totally incorporated herein by reference.

When present, the ester or ester-amide is present in the ink carrier in any desired or effective amount, in one specific embodiment at least about 5 percent by weight, in another embodiment at least about 10 percent by weight, and in yet another embodiment at least about 13 percent by weight, and in one embodiment no more than about 32 percent by weight, in another embodiment no more than about 27 percent by weight, and in yet another embodiment no more than about 22 percent by weight, although the amount can be outside of these ranges.

The phase change ink carrier also contains a polyalkylene wax. The polyalkylene wax can be any desired polyalkylene wax, such as polyethylene, polypropylene, polybutylene, or the like, as well as mixtures thereof. Examples of suitable polyethylene waxes include those of the formula $CH_3-(CH_2)_n-CH_3$ wherein n is an integer representing the number of repeat $-CH_2-$ units, in one embodiment at least about 30, in another embodiment at least about 46, and in yet another embodiment at least about 52, and in one embodiment no more than about 214, in another embodiment no more than about 72, and in yet another embodiment no more than about 60, although the number of repeat $-CH_2-$ groups can be outside of these ranges. One specific example of a suitable polyethylene wax is POLYWAX 655, available from Baker Petrolite, wherein n has an average value of from about 46 to about 50. Another specific example of a suitable polyethylene wax is POLYWAX 3000, available from Baker Petrolite, wherein n has an average value of about 214. The polyalkylene wax is present in the ink carrier in any desired or effective amount, in one embodiment at least about 15 percent by weight, in another embodiment at least about 25 percent by weight, in yet another embodiment at least about 30 percent by weight, and in still another embodiment at least about 37 percent by weight, and in one embodiment no more than about 60 percent by weight, in another embodiment no more than about 53 percent by weight, and in yet another embodiment no more than about 48 percent by weight, although the amount can be outside of these ranges.

Additional suitable phase change ink carrier materials include paraffins, microcrystalline waxes, fatty acids, fatty alcohols, and other waxy materials, sulfonamide materials, resinous materials made from different natural sources (such as, for example, tall oil rosins and rosin esters), and many synthetic resins, oligomers, polymers and copolymers, such as ethylene/vinyl acetate copolymers, ethylene/acrylic acid copolymers, ethylene/vinyl acetate/acrylic acid copolymers, copolymers of acrylic acid with polyamides, and the like, ionomers, and the like, as well as mixtures thereof. One or more of these materials can also be employed in a mixture with a fatty amide material and/or an isocyanate-derived material.

In one specific embodiment, the phase change ink carrier comprises (a) a polyethylene wax, present in the carrier in an amount in one embodiment of at least about 15 percent by weight, in another embodiment of at least about 25 percent by weight, in yet another embodiment of at least about 30 percent by weight, and in still another embodiment of at least about 37 percent by weight, and in one embodiment of no more than about 60 percent by weight, in another embodiment of no more than about 53 percent by weight, and in yet another embodiment of no more than about 48 percent by weight, although the amount can be outside of these ranges; (b) a stearyl stearamide wax, present in the carrier in an amount in one embodiment of at least about 8 percent by weight, in another embodiment of at least about 10 percent by weight, and in yet another embodiment of at least about 12 percent by weight, and in one embodiment of no more than about 32 percent by weight, in another embodiment of no more than about 28 percent by weight, and in yet another embodiment of no more than about 25 percent by weight, although the amount can be outside of these ranges; (c) a dimer acid based tetra-amide that is the reaction product of dimer acid, ethylene diamine, and a long chain hydrocarbon having greater than thirty six carbon atoms and having a terminal carboxylic acid group, present in the carrier in an amount in one embodiment of at least about 10 percent by weight, in another embodiment of at least about 13 percent by weight, and in yet another embodiment of at least about 16 percent by weight, and in one embodiment of no more than about 32 percent by weight, in another embodiment of no more than about 27 percent by weight, and in yet another embodiment of no more than about 22 percent by weight, although the amount can be outside of these ranges; (d) a urethane resin derived from the reaction of two equivalents of hydroabietyl alcohol and one equivalent of isophorone diisocyanate, present in the carrier in an amount in one embodiment of at least about 6 percent by weight, in another embodiment of at least about 8 percent by weight, and in yet another embodiment of at least about 10 percent by weight, and in one embodiment of no more than about 16 percent by weight, in another embodiment of no more than about 14 percent by weight, and in yet another embodiment of no more than about 12 percent by weight, although the amount can be outside of these ranges; (e) a urethane resin that is the adduct of three equivalents of stearyl isocyanate and a glycerol-based alcohol, present in the carrier in an amount in one embodiment of at least about 2 percent by weight, in another embodiment of at least about 3 percent by weight, and in yet another embodiment of at least about 4.5 percent by weight, and in one embodiment of no more than about 13 percent by weight, in another embodiment of no more than about 10 percent by weight, and in yet another embodiment of no more than about 7.5 percent by weight, although the amount can be outside of these ranges; and (f) an antioxidant, present in the carrier in an amount in one embodiment of at least about 0.01 percent by weight, in another embodiment of at least about 0.05 percent by weight, and in yet another embodiment of at least about 0.1 percent by weight, and in one embodiment of no more than about 1 percent by weight, in another embodiment of no more than about 0.5 percent by weight, and in yet another embodiment of no more than about 0.3 percent by weight, although the amount can be outside of these ranges.

The ink carrier is present in the phase change ink in any desired or effective amount, in one embodiment of at least about 0.1 percent by weight of the ink, in another embodiment of at least about 50 percent by weight of the ink, and in yet another embodiment of at least about 90 percent by weight of the ink, and in one embodiment of no more than about 99 percent by weight of the ink, in another embodiment of no more than about 98 percent by weight of the ink, and in yet another embodiment of no more than about 95 percent by weight of the ink, although the amount can be outside of these ranges.

In one specific embodiment, the phase change ink carrier has a Hildebrand solubility parameter of at least about 8.3 $(cal/cc)^{0.5}$, and in one specific embodiment, the phase change ink carrier has a Hildebrand solubility parameter of no more than about 9.5 $(cal/cc)^{0.5}$, although the Hildebrand solubility parameter can be outside of these ranges. The Hildebrand solubility parameter $\delta$ is calculated as the square root of a material's cohesive energy density, as follows:

$$\delta = (C)^{1/2} = \left[ \frac{\Delta H - RT}{V_m} \right]^{1/2}$$

wherein c is cohesive energy density, $\Delta H$ is the heat of vaporization, R is the gas constant, T is the temperature, and $V_m$ is the molar volume. The Hildebrand solubility parameter of a mixture of materials can be determined by the average Hildebrand values of the components in terms of their percentage by volume.

The inks disclosed herein also contain pigment particles having hydrophobic functional groups covalently bonded to the surfaces thereof. The pigment particles can be of any desired color, including (but not limited to) black, cyan, magenta, yellow, red, blue, green, brown, gold, gray, purple, orange, pink, and the like, as well as mixtures thereof. Any pigment material either having hydrophobic functional groups thereon or capable of being chemically treated to place hydrophobic functional groups thereon can be employed. Specific examples of suitable pigments include (but are not limited to) anthraquinones, phthalocyanines, monoazos, diazos, pyranthrones, perylenes, heterocyclics, quinacridones, indigoids, thioindigoids, various carbon blacks, such as furnace black, channel black, thermal black, lamp black, and the like, graphite, vitreous carbon, activated charcoal, carbon fiber, and the like, as well as mixtures thereof.

Specific examples of suitable hydrophobic functional groups include (but are not limited to) alkyl group (including linear, branched, saturated, unsaturated, cyclic, substituted, and unsubstituted alkyl groups, and wherein hetero atoms, such as oxygen, nitrogen, sulfur, silicon, phosphorus, and the like either may or may not be present in the alkyl group), in one embodiment with at least 3 carbon atom, in another embodiment with at least about 10 carbon atoms, and in yet another embodiment with at least about 14 carbon atoms, and in one embodiment with no more than about 96 carbon atoms, in another embodiment with no more than about 24 carbon atoms, and in yet another embodiment with no more than about 14 carbon atoms, although the number of carbon atoms can be outside of these ranges, aryl groups (including unsubstituted and substituted aryl groups, and wherein hetero atoms, such as oxygen, nitrogen, sulfur, silicon, phosphorus, and the like either may or may not be present in the aryl group), in one embodiment with at least about 6 carbon atoms, and in another embodiment with at least about 9 carbon atoms, and in one embodiment with no more than about 96 carbon atoms, in another embodiment with no more than about 24 carbon atoms, and in yet another embodiment with no more than about 10 carbon atoms, although the number of carbon atoms can be outside of these ranges, arylalkyl groups (including unsubstituted and substituted arylalkyl groups, wherein the alkyl portion of the arylalkyl group can be linear, branched, saturated, unsaturated, and/or cyclic, and wherein hetero atoms, such as oxygen, nitrogen, sulfur, silicon, phosphorus, and the like either may or may not be present in either or both of the alkyl portion and the aryl portion of the arylalkyl group), in one embodiment with at least about 7 carbon atoms, in another embodiment with at least about 12 carbon atoms, and in yet another embodiment with at least about 18 carbon atoms, and in one embodiment with no more than about 96 carbon atoms, in another embodiment with no more than about 48 carbon atoms, and in yet another embodiment with no more than about 18 carbon atoms, although the number of carbon atoms can be outside of these ranges, such as benzyl or the like, alkylaryl groups (including unsubstituted and substituted alkylaryl groups, wherein the alkyl portion of the alkylaryl group can be linear, branched, saturated, unsaturated, and/or cyclic, and wherein hetero atoms, such as oxygen, nitrogen, sulfur, silicon, phosphorus, and the like either may or may not be present in either or both of the alkyl portion and the aryl portion of the alkylaryl group), in one embodiment with at least about 7 carbon atoms, in another embodiment with at least about 12 carbon atoms, and in yet another embodiment with at least about 18 carbon atoms, and in one embodiment with no more than about 96 carbon atoms, in another embodiment with no more than about 48 carbon atoms, and in yet another embodiment with no more than about 18 carbon atoms, although the number of carbon atoms can be outside of these ranges, such as tolyl or the like, wherein the substituents on the substituted alkyl, aryl arylalkyl, and alkylaryl groups can be (but are not limited to) hydroxy groups, halogen atoms, amine groups, imine groups, ammonium groups, cyano groups, pyridine groups, pyridinium groups, ether groups, aldehyde groups, ketone groups, ester groups, amide groups, carbonyl groups, thiocarbonyl groups, sulfate groups, sulfonate groups, sulfonic acid groups, sulfide groups, sulfoxide groups, phosphine groups, phosphonium groups, phosphate groups, nitrile groups, mercapto groups, nitro groups, nitroso groups, sulfone groups, acyl groups, acid anhydride groups, azide groups, azo groups, cyanato groups, isocyanato groups, thiocyanato groups, isothiocyanato groups, carboxylate groups, carboxylic acid groups, urethane groups, urea groups, mixtures thereof, and the like, wherein two or more substituents can be joined together to form a ring. Since hetero atoms can be included in the alkyl, aryl, arylalkyl, and alkylaryl groups, and since the groups can be substituted, it is to be understood that suitable hydrophobic groups also include groups such as alkoxy groups, polyalkyleneoxy groups, aryloxy groups, polyaryleneoxy groups, arylalkyloxy groups, polyarylalkyleneoxy groups, alkylaryloxy groups, polyalkylaryleneoxy groups, and the like. Mixtures of two or more different functional groups can also be covalently bonded to the surfaces of the pigment particles.

Also suitable as hydrophobic functional groups are polymers, as disclosed in, for example, EP 1 220 879, the disclosure of which is totally incorporated herein by reference. The pigment can, for example, have covalently bonded thereto a group of the general formula X-Sp-(polymer)-R, wherein X is an alkylene group (including linear, branched, saturated, unsaturated, cyclic, substituted, and unsubstituted alkylene groups, and wherein hetero atoms, such as oxygen, nitrogen, sulfur, silicon, phosphorus, and the like either may or may not be present in the alkylene group), such as methylene, ethylene, propylene, butylene, pentylene, hexylene, or the like, an arylene group (including substituted and unsubstituted arylene groups, and wherein hetero atoms, such as oxygen, nitrogen, sulfur, silicon, phosphorus, and the like either may or may not be present in the arylene group), such as phenylene, naphthylene, anthracenylene, phenanthrenylene, biphenylene, pyridinylene, benzothiadiazolylene, benzothiazolylene, or the like, an arylalkylene group (including unsubstituted and substituted arylalkylene groups, wherein the alkyl portion of the arylalkylene group can be linear, branched, saturated, unsaturated, and/or cyclic, and wherein hetero atoms, such as oxygen, nitrogen, sulfur, silicon, phosphorus, and the like either may or may not be present in either or both of the alkyl portion and the aryl portion of the arylalkylene group), such as benzylene or the like, or an alkylarylene group (including substituted and unsubstituted alkylarylene groups, and wherein hetero atoms, such as oxygen, nitrogen, sulfur, silicon, phosphorus, and the like either may or may not be present in either or both of the alkyl portion and the aryl portion of the alkylarylene group), such as tolylene or the like, Sp is a spacer group, such as a direct bond (i.e., nothing), or a chemical group, including (but not limited to) $CO_2$, $O_2C$, $SO_2$, $CO$, $NHCO$, $CONR''$, $NR''CO$, $OCNR''$, $NR''CONR''$, $O$, $S$, $NR''$, $SO_2C_2H_4$, arylene, alkylene, $NR''CO$, $NHCO_2$, $O_2CNH$, $NCHONH$, or the like, wherein $R''$, which can be the same or different, represents an organic group such as a substituted or unsubstituted aryl, alkyl, arylalkyl, or alkylaryl group, R is a hydrogen atom, an alkyl group (including linear, branched, saturated, unsaturated, cyclic, substituted, and unsubstituted alkyl groups, and wherein hetero atoms, such as oxygen, nitrogen, sulfur, silicon, phosphorus, and the like either may or may not be present in the alkyl group), such as methyl, ethyl, propyl, butyl, pentyl, hexyl, or the like, an aryl group (including substituted and unsubstituted aryl groups, and wherein hetero atoms, such as oxygen, nitrogen, sulfur, silicon, phosphorus, and the like either may or may not be present in the aryl group), such as phenyl, naphthyl, anthracenyl, phenanthrenyl, biphenyl, pyridinyl, benzothiadiazolyl, benzothiazolyl, or the like, an arylalkyl group (including unsubstituted and substituted arylalkyl groups, wherein the alkyl portion of the arylalkyl group can be linear, branched, saturated, unsaturated, and/or cyclic, and wherein hetero atoms, such as oxygen, nitrogen, sulfur, silicon, phosphorus, and the like either may or may not be present in either or both of the alkyl portion and the aryl portion of the arylalkyl group), such as benzyl or the like, or an alkylaryl group (including substituted and unsubstituted alkylaryl groups, and wherein hetero atoms, such as oxygen, nitrogen, sulfur, silicon, phosphorus, and the like either may or may not be present in either or both of the alkyl portion and the aryl portion of the alkylaryl group), such as tolyl or the like, and (polymer) comprises repeating monomer groups or multiple monomer groups or both, including thermoplastic polymers, thermosetting polymers, mixtures thereof, and the like, homopolymers, copolymers, terpolymers, and the like, as well as mixtures thereof, random polymers, alternating polymers, graft polymers, block polymers, starlike polymers, comb-like polymers, polyblends, and the like, as well as mixtures thereof, interpenetrating polymer networks (IPN), simultaneous interpenetrating polymer networks (SIN), interpenetrating elastomeric networks (IEN), and the like, as well as mixtures thereof, with examples including (but not limited to) linear-high polymers such as polyethylene, poly (vinylchloride), polyisobutylene, polystyrene, polycaprolactam (nylon), polyisoprene, and the like, with other general classes of polymeric groups including but not being limited to polyamides, polycarbonates, polyelectrolytes, polyesters, polyethers, (polyhydroxy) benzenes, polyimides, polymers containing sulfur (such as polysulfides, (polyphenylene) sulfide, and polysulfones), polyolefins, polymethylbenzenes, polystyrene and styrene copolymers (ABS included), acetal polymers, acrylic polymers, acrylonitrile polymers and copolymers, polyolefins containing halogen (such as polyvinyl chloride and polyvinylidene chloride), fluoropolymers, ionomeric polymers, polymers containing ketone group(s), liquid crystal polymers, polyamideimides, polymers containing olefinic double bond(s) (such as polybutadiene, polydicyclopentadiene), polyolefin copolymers, polyphenylene oxides, poly (vinyl alcohols), polyurethanes, thermoplastic elastomers, and the like, as well as mixtures thereof, wherein the substituents on the substituted alkyl, alkylene, aryl, arylene, arylalkyl, arylalkylene, alkylaryl, and alkylarylene groups can be (but are not limited to) hydroxy groups, halogen atoms, amine groups, imine groups, ammonium groups, cyano groups, pyridine groups, pyridinium groups, ether groups, aldehyde groups, ketone groups, ester groups, amide groups, carbonyl groups, thiocarbonyl groups, sulfate groups, sulfonate groups, sulfonic acid groups, sulfide groups, sulfoxide groups, phosphine groups, phosphonium groups, phosphate groups, nitrile groups, mercapto groups, nitro groups, nitroso groups, sulfone groups, acyl groups, acid anhydride groups, azide groups, azo groups, cyanato groups, isocyanato groups, thiocyanato groups, isothiocyanato groups, carboxylate groups, carboxylic acid groups, urethane groups, urea groups, mixtures thereof, and the like, wherein two or more substituents can be joined together to form a ring. Since hetero atoms can be included in the alkyl, alkylene, aryl, arylene, arylalkyl, arylalkylene, alkylaryl, and alkylarylene groups, and since the groups can be substituted, it is to be understood that suitable hydrophobic groups also include groups such as alkoxy groups, polyalkyleneoxy groups, aryloxy groups, polyaryleneoxy groups, arylalkyloxy groups, polyarylalkyleneoxy groups, alkylaryloxy groups, polyalkylaryleneoxy groups, and the like. In one specific embodiment, the total monomer repeating units that comprise the polymer is not greater than about 500 monomer repeating units. In another specific embodiment, the polymer has a molecular weight in one embodiment of at least about 2,000, in another embodiment of at least about 10,000, and in yet another embodiment of at least about 20,000, and in one embodiment of no more than about 100,000, in another embodiment of no more than about 50,000, and in yet another embodiment of no more than about 20,000, although the molecular weight can be outside of these ranges.

Pigment particles having hydrophobic functional groups covalently bonded to the surfaces thereof are known. These groups can be placed on the pigment particles by any desired or effective method. For example, treatment of the pigment particles with a diazonium salt containing the functional group to be attached to the particles in any desired or effective solvent, including (but not limited to) water, aqueous mixtures, alcohols, alcohol-containing mixtures, or the like. The diazonium salt can be derived from a primary amine having the desired hydrophobic group and being capable of forming, even transiently, a diazonium salt. Monomeric, oligomeric, and polymeric hydrophobic groups can be placed on pigment particles by this method.

Chemically modified pigments and methods for the preparation thereof are disclosed in, for example, U.S. Pat. Nos. 6,506,245, 6,494,943, 6,472,471, 6,398,858, 6,177,498, 6,042,643, 5,922,118, 5,900,029, 5,895,522, 5,885,335, 5,851,280, 5,837,045, 5,803,959, 5,713,988, 5,707,432, 5,698,016, 5,672,198, 5,630,868, 5,571,311, 5,554,739, 5,281,261, 5,184,148, 4,530,961, European Patent Publication 0 797 635, European Patent Publication 0 797 636, European Patent Publication EP 1 220 879, European Patent Publication 1 007 595, European Patent Publication EP 0910 611, PCT Patent Publication WO 96/18688, PCT Patent Publication WO 92/13983, PCT Patent Publication WO 91/15425, and PCT Patent Publication WO 96/18690, the disclosures of each of which are totally incorporated herein by reference. Pigment particles having covalently bonded to the surfaces thereof hydrophobic groups are also commercially available. Examples of suitable pigments include CABOT® IJX 413, available from Cabot Chemical Co., Boston, Mass., and the like.

In a specific embodiment, the pigment particles have functional groups covalently bonded to the surfaces thereof that enable the particles to form stable dispersions in polyethylene waxes. Examples of suitable polyethylene waxes include those of the formula $CH_3—(CH_2)_n—CH_3$ wherein n is an integer representing the number of repeat $—CH_2—$ units, in one embodiment at least about 30, in another embodiment at least about 46, and in yet another embodiment at least about 52, and in one embodiment no more than about 214, in another embodiment no more than about 72, and in yet another embodiment no more than about 60, although the number of repeat $—CH_2—$ groups can be outside of these ranges. One specific example of a suitable polyethylene wax is POLYWAX 655, available from Baker Petrolite, wherein n has an average value of from about 46 to about 50. Another specific example of a suitable polyethylene wax is POLYWAX 3000, available from Baker Petrolite, wherein n has an average value of about 214.

The pigment is present in the phase change ink in any desired or effective amount to obtain the desired color or hue, in one embodiment at least about 0.1 percent by weight of the ink, in another embodiment at least about 0.2 percent by weight of the ink, and in yet another embodiment at least about 0.5 percent by weight of the ink, and in one embodiment no more than about 50 percent by weight of the ink, in another embodiment no more than about 20 percent by weight of the ink, and in yet another embodiment no more than about 10 percent by weight of the ink, although the amount can be outside of these ranges.

If so desired, dyes can also optionally be included in the inks as auxiliary colorants. Examples of suitable dyes include Color Index (C.I.) Solvent Dyes, Disperse Dyes, modified Acid and Direct Dyes, Basic Dyes, Sulphur Dyes, Vat Dyes, and the like. Specific examples of suitable dyes include Neozapon Red 492 (BASF); Orasol Red G (Ciba-Geigy); Direct Brilliant Pink B (Crompton & Knowles); Aizen Spilon Red C-BH (Hodogaya Chemical); Kayanol Red 3BL (Nippon Kayaku); Levanol Brilliant Red 3BW (Mobay Chemical); Levaderm Lemon Yellow (Mobay Chemical); Spirit Fast Yellow 3G; Aizen Spilon Yellow C-GNH (Hodogaya Chemical); Sirius Supra Yellow GD 167; Cartasol Brilliant Yellow 4GF (Sandoz); Pergasol Yellow CGP (Ciba-Geigy); Orasol Black RLP (Ciba-Geigy); Savinyl Black RLS (Sandoz); Dermacarbon 2GT (Sandoz); Pyrazol Black BG (ICI); Morfast Black Conc. A (Morton-Thiokol); Diaazol Black RN Quad (ICI); Orasol Blue GN (Ciba-Geigy); Savinyl Blue GLS (Sandoz); Luxol Blue MBSN (Morton-Thiokol); Sevron Blue 5GMF (ICI); Basacid Blue 750 (BASF), Neozapon Black X51 (C.I. Solvent Black, C.I. 12195) (BASF), Sudan Blue 670 (C.I. 61554) (BASF), Sudan Yellow 146 (C.I. 12700) (BASF), Sudan Red 462 (C.I. 26050) (BASF), Intratherm Yellow 346 from Crompton and Knowles, C.I. Disperse Yellow 238, Neptune Red Base NB543 (BASF, C.I. Solvent Red 49), Neopen Blue FF-4012 from BASF, Lampronol Black BR from ICI (C.I. Solvent Black 35), Morton Morplas Magenta 36 (C.I. Solvent Red 172), metal phthalocyanine colorants such as those disclosed in U.S. Pat. No. 6,221,137, the disclosure of which is totally incorporated herein by reference, and the like. Polymeric dyes can also be used, such as those disclosed in, for example, U.S. Pat. Nos. 5,621,022 and 5,231,135, the disclosures of each of which are totally incorporated herein by reference, and commercially available from, for example, Milliken & Company as Milliken Ink Yellow 12, Milliken Ink Blue 92, Milliken Ink Red 357, Milliken Ink Yellow 1800, Milliken Ink Black 8915-67, uncut Reactant Orange X-38, uncut Reactant Blue X-17, Solvent Yellow 162, Acid Red 52, Solvent Blue 44, and uncut Reactant Violet X-80.

Also suitable as dyes for the ink are the colorants disclosed in U.S. Pat. No. 6,472,523, Copending application U.S. Ser. No. 10/072,210, filed Feb. 8, 2002, entitled "Ink Compositions Containing Phthalocyanines," U.S. Pat. Nos. 6,476,219, 6,576,747, Copending application U.S. Ser. No.

10/185,994, filed Jun. 27, 2002, entitled "Dimeric Azo Pyridone Colorants," Copending application U.S. Ser. No. 10/184,269, filed Jun. 27, 2002, entitled "Phase Change Inks Containing Dimeric Azo Pyridone Colorants," Copending application U.S. Ser. No. 10/185,264, filed Jun. 27, 2002, entitled "Phase Change Inks Containing Azo Pyridone Colorants," U.S. Pat. No. 6,590,082, Copending application U.S. Ser. No. 10/185,597, filed Jun. 27, 2002, entitled "Process for Preparing Substituted Pyridone Compounds," U.S. Pat. Nos. 6,576,748, 6,646,111, Copending application U.S. Ser. No. 10/184,266, filed Jun. 27, 2002, entitled "Phase Change Inks Containing Dimeric Azo Pyridone Colorants," Copending application U.S. Ser. No. 10/260,146, filed Sep. 27, 2002, entitled "Colorant Compounds," with the named inventors Jeffery H. Banning and C. Wayne Jaeger, and Copending application U.S. Ser. No. 10/260,379, filed Sep. 27, 2002, entitled "Methods for Making Colorant Compounds," with the named inventors C. Wayne Jaeger and Jeffery H. Banning, the disclosures of each of which are totally incorporated herein by reference.

In one specific embodiment, the inks also contain a surfactant. In a more specific embodiment, the surfactant is capable of forming a bi-layered structure between the ink carrier and the pigment particles having the hydrophobic groups covalently bound to the surfaces thereof when the ink is in molten or liquid form. In this embodiment, it is believed that multilayered inverse liposomes form, with hydrophobic layers on the inside around the pigment particles and also on the outside in contact with the hydrophobic ink carrier. Structures of these type are shown in, for example, *J. Am Chem. Soc.*, Vol. 113, No. 3, 1991, 1051-1052, the disclosure of which is totally incorporated herein by reference, with the exception that no water is present in the inks. Optionally, low molecular weight monoalcohols, diols, and/or triols can be added in minor concentrations to the phase change ink carrier to help in the formation of liposomic structures. Such monoalcohols, diols, and/or triols have, in one embodiment, a molecular weight of less than about 1,000, in another embodiment of less than about 500, and in yet another embodiment of less than about 300, although the molecular weight can be outside of these ranges.

Examples of suitable surfactants include polyoxyethylene nonionic surfactants, such as the NIKKOL BR-nSY series available from Nikko Chemicals, Japan, of the general formula $RO(CH_2CH_2O)_nH$ wherein R is a linear alkyl group with 10, 12, 14, or 16 carbon atoms and n is 1, 2, 3, 4, 5, 6, 7, or 8, such as ethyleneglycol mono n-decyl ether, diethyleneglycol mono n-decyl ether, triethyleneglycol mono n-decyl ether, tetraethyleneglycol mono n-decyl ether, pentaethyleneglycol mono n-decyl ether, hexaethyleneglycol mono n-decyl ether, heptaethyleneglycol mono n-decyl ether, octaethyleneglycol mono n-decyl ether, ethyleneglycol mono n-dodecyl ether, diethyleneglycol mono n-dodecyl ether, triethyleneglycol mono n-dodecyl ether, tetraethyleneglycol mono n-dodecyl ether, pentaethyleneglycol mono n-dodecyl ether, hexaethyleneglycol mono n-dodecyl ether, heptaethyleneglycol mono n-dodecyl ether, octaethyleneglycol mono n-dodecyl ether, ethyleneglycol mono n-tetradecyl ether, diethyleneglycol mono n-tetradecyl ether, triethyleneglycol mono n-tetradecyl ether, tetraethyleneglycol mono n-tetradecyl ether, pentaethyleneglycol mono n-tetradecyl ether, hexaethyleneglycol mono n-tetradecyl ether, heptaethyleneglycol mono n-tetradecyl ether, octaethyleneglycol mono n-tetradecyl ether, ethyleneglycol mono n-hexadecyl ether, diethyleneglycol mono n-hexadecyl ether, triethyleneglycol mono n-hexadecyl ether, tetraethyleneglycol mono n-hexadecyl ether, pentaethyleneglycol mono n-hexadecyl ether, hexaethyleneglycol mono n-hexadecyl ether, heptaethyleneglycol mono n-hexadecyl ether, octaethyleneglycol mono n-hexadecyl ether, and the like, as well as mixtures thereof. Any other surfactant capable of further enhancing solubility of the pigment particles in the ink and/or of forming vesicles or liposomes around the pigment particles in the ink can also be used.

When present, the optional surfactant is present in any desired or effective amount, in one embodiment at least about 50 percent by weight of the pigment, in another embodiment at least about 100 percent by weight of the pigment, and in yet another embodiment at least about 200 percent by weight of the pigment, although the amount of surfactant can be outside of these ranges.

The inks can also optionally contain an antioxidant. The optional antioxidants of the ink compositions protect the images from oxidation and also protect the ink components from oxidation during the heating portion of the ink preparation process. Specific examples of suitable antioxidants include NAUGUARD® 10, NAUGUARD® 524, NAUGUARD® 76, NAUGUARD® 512, NAUGUARD® XL-1, and NAUGUARD® HM-22, commercially available from Uniroyal Chemical Company, Oxford, Conn., CGL 545, IRGACOR® 252 FC, IRGANOX® 1010, IRGANOX® 1035, IRGANOX® B 900, IRGANOX® 1330 FF, IRGANOX® MD 1024, IRGANOX® 3114, IRGAROL® 1051, IRGAFOS® 38, IRGAFOS® 168, TINUVIN® 111 FB, TINUVIN® 144, and TINUVIN® 622 FB, commercially available from Ciba Geigy, UVINUL® 3048, commercially available from BASF, and the like, as well as mixtures thereof. When present, the optional antioxidant is present in the ink in any desired or effective amount, in one embodiment of at least about 0.01 percent by weight of the ink, in another embodiment of at least about 0.1 percent by weight of the ink, and in yet another embodiment of at least about 1 percent by weight of the ink, and in one embodiment of no more than about 20 percent by weight of the ink, in another embodiment of no more than about 5 percent by weight of the ink, and in yet another embodiment of no more than about 3 percent by weight of the ink, although the amount can be outside of these ranges.

The inks can also optionally contain a viscosity modifier. Examples of suitable viscosity modifiers include aliphatic ketones, such as stearone, and the like. When present, the optional viscosity modifier is present in the ink in any desired or effective amount, in one embodiment of at least about 0.1 percent by weight of the ink, in another embodiment of at least about 1 percent by weight of the ink, and in yet another embodiment of at least about 10 percent by weight of the ink, and in one embodiment of no more than about 99 percent by weight of the ink, in another embodiment of no more than about 30 percent by weight of the ink, and in yet another embodiment of no more than about 15 percent by weight of the ink, although the amount can be outside of these ranges.

Other optional additives to the inks include clarifiers, such as UNION CAMP® X37-523-235 (commercially available from Union Camp), in an amount in one embodiment of at least about 0.01 percent by weight of the ink, in another embodiment of at least about 0.1 percent by weight of the ink, and in yet another embodiment of at least about 5 percent by weight of the ink, and in one embodiment of no more than about 98 percent by weight of the ink, in another embodiment of no more than about 50 percent by weight of the ink, and in yet another embodiment of no more than about 10 percent by weight of the ink, although the amount can be outside of these ranges, tackifiers, such as FORAL®

85, a glycerol ester of hydrogenated abietic (rosin) acid (commercially available from Hercules), FORAL® 105, a pentaerythritol ester of hydroabietic (rosin) acid (commercially available from Hercules), CELLOLYN® 21, a hydroabietic (rosin) alcohol ester of phthalic acid (commercially available from Hercules), ARAKAWA KE-311 Resin, a triglyceride of hydrogenated abietic (rosin) acid (commercially available from Arakawa Chemical Industries, Ltd.), synthetic polyterpene resins such as NEVTAC® 2300, NEVTAC® 100, and NEVTAC® 80 (commercially available from Neville Chemical Company), WINGTACK® 86, a modified synthetic polyterpene resin (commercially available from Goodyear), and the like, in an amount in one embodiment of at least about 0.1 percent by weight of the ink, in another embodiment of at least about 5 percent by weight of the ink, and in yet another embodiment of at least about 10 percent by weight of the ink, and in one embodiment of no more than about 98 percent by weight of the ink, in another embodiment of no more than about 75 percent by weight of the ink, and in yet another embodiment of no more than about 50 percent by weight of the ink, although the amount can be outside of these range, adhesives, such as VERSAMID® 757, 759, or 744 (commercially available from Henkel), in an amount in one embodiment of at least about 0.1 percent by weight of the ink, in another embodiment of at least about 1 percent by weight of the ink, and in yet another embodiment of at least about 5 percent by weight of the ink, and in one embodiment of no more than about 98 percent by weight of the ink, in another embodiment of no more than about 50 percent by weight of the ink, and in yet another embodiment of no more than about 10 percent by weight of the ink, although the amount can be outside of these ranges, plasticizers, such as UNIPLEX® 250 (commercially available from Uniplex), the phthalate ester plasticizers commercially available from Monsanto under the trade name SANTICIZER®, such as dioctyl phthalate, diundecyl phthalate, alkylbenzyl phthalate (SANTICIZER® 278), triphenyl phosphate (commercially available from Monsanto), KP-140®, a tributoxyethyl phosphate (commercially available from FMC Corporation), MORFLEX® 150, a dicyclohexyl phthalate (commercially available from Morflex Chemical Company Inc.), trioctyl trimellitate (commercially available from Eastman Kodak Co.), and the like, in an amount in one embodiment of at least about 0.1 percent by weight of the ink, in another embodiment of at least about 1 percent by weight of the ink, and in yet another embodiment of at least about 2 percent by weight of the ink, and in one embodiment of no more than about 50 percent by weight of the ink, in another embodiment of no more than about 30 percent by weight of the ink, and in yet another embodiment of no more than about 10 percent by weight of the ink, although the amount can be outside of these ranges, and the like.

The ink compositions of the present invention can be prepared by any desired or suitable method. For example, the ink ingredients can be mixed together, followed by heating, typically to a temperature of from about 100 to about 140° C., although the temperature can be outside of this range, and stirring until a homogeneous ink composition is obtained, followed by cooling the ink to ambient temperature (typically from about 20 to about 25° C.). The inks of the present invention are solid at ambient temperature. While not required, if desired, the molten ink ingredients can be subjected to low shear homogenizing, high shear homogenizing, or the like as disclosed in, for example, Copending application U.S. Ser. No. 10/722,164, Copending application U.S. Ser. No. 10/722,162, and Copending application U.S. Ser. No. 10/721,851, the disclosures of each of which are totally incorporated herein by reference.

The ink compositions in one embodiment have melting points no lower than about 40° C., in another embodiment no lower than about 50° C., in yet another embodiment no lower than about 70° C., and in still another embodiment no lower than about 80° C., and in one embodiment have melting points no higher than about 160° C., in another embodiment no higher than about 140° C., and in yet another embodiment no higher than about 100° C., although the melting point can be outside of these ranges.

The ink compositions generally have melt viscosities at the jetting temperature (in one embodiment no lower than about 75° C., in another embodiment no lower than about 100° C., and in yet another embodiment no lower than about 120° C., and in one embodiment no higher than about 180° C., in another embodiment no higher than about 150° C., and in yet another embodiment no higher than about 130° C., although the jetting temperature can be outside of these ranges) in one embodiment of no more than about 30 centipoise, in another embodiment no more than about 20 centipoise, and in yet another embodiment no more than about 15 centipoise, and in one embodiment of no less than about 2 centipoise, in another embodiment no less than about 5 centipoise, and in yet another embodiment no less than about 7 centipoise, although the melt viscosity can be outside of these ranges.

The inks can be employed in apparatus for direct printing ink jet processes and in indirect (offset) printing ink jet applications. Another embodiment is directed to a process which comprises incorporating an ink of the present invention into an ink jet printing apparatus, melting the ink, and causing droplets of the melted ink to be ejected in an imagewise pattern onto a recording substrate. A direct printing process is also disclosed in, for example, U.S. Pat. No. 5,195,430, the disclosure of which is totally incorporated herein by reference. Yet another embodiment is directed to a process which comprises incorporating an ink of the present invention into an ink jet printing apparatus, melting the ink, causing droplets of the melted ink to be ejected in an imagewise pattern onto an intermediate transfer member, and transferring the ink in the imagewise pattern from the intermediate transfer member to a final recording substrate. In one specific embodiment, the intermediate transfer member is heated to a temperature above that of the final recording sheet and below that of the melted ink in the printing apparatus. An offset or indirect printing process is also disclosed in, for example, U.S. Pat. No. 5,389,958, the disclosure of which is totally incorporated herein by reference. In one specific embodiment, the printing apparatus employs a piezoelectric printing process wherein droplets of the ink are caused to be ejected in imagewise pattern by oscillations of piezoelectric vibrating elements. The inks can also be employed in other hot melt printing processes, such as hot melt acoustic ink jet printing, hot melt thermal ink jet printing, hot melt continuous stream or deflection ink jet printing, or the like. Phase change inks can also be used in printing processes other than hot melt ink jet printing processes, such as hot melt gravure printing, hot melt medical imaging printing, or the like.

Any suitable substrate or recording sheet can be employed, including plain papers such as XEROX® 4024 papers, XEROX® Image Series papers, Courtland 4024 DP paper, ruled notebook paper, bond paper, silica coated papers such as Sharp Company silica coated paper, JuJo paper, and the like, transparency materials, fabrics, textile products, plastics, polymeric films, inorganic substrates such as metals and wood, and the like.

Specific embodiments will now be described in detail. These examples are intended to be illustrative, and the claims are not limited to the materials, conditions, or process parameters set forth in these embodiments. All parts and percentages are by weight unless otherwise indicated.

EXAMPLE I

Surface modified carbon black pigment (IJX 413) obtained from Cabot Corp. as a dispersion of 10 to 15 percent by weight pigment in hexane was treated by removing the hexane by evaporation at 60° C. Thereafter, 5 grams of the dried pigment particles was added to 38.7 grams of polyethylene wax (POLYWAX 655, obtained from Baker Petrolite, of the formula $CH_3(CH_2)_{50}CH_3$), 21.6 grams of stearyl stearamide (KEMAMIDE S-180, obtained from Witco, Humko Chemical Division, Memphis, Tenn.), 15.9 grams of a tetra-amide resin obtained from the reaction of one equivalent of a C-36 dimer acid obtained from Uniqema, New Castle, Del. with two equivalents of ethylene diamine and UNICID® 700 (obtained from Baker Petrolite, Tulsa, Okla., a long chain hydrocarbon having a terminal carboxylic acid group), prepared as described in Example 1 of U.S. Pat. No. 6,174,937, the disclosure of which is totally incorporated herein by reference, 11.8 grams of a urethane resin obtained from the reaction of two equivalents of ABITOL® E hydroabietyl alcohol (obtained from Hercules Inc., Wilmington, Del.) and one equivalent of isophorone diisocyanate, prepared as described in Example 1 of U.S. Pat. No. 5,782,966, the disclosure of which is totally incorporated herein by reference, 5.0 grams of a urethane resin that was the adduct of three equivalents of stearyl isocyanate and a glycerol-based alcohol, prepared as described in Example 4 of U.S. Pat. No. 6,309,453, the disclosure of which is totally incorporated herein by reference, and 2.0 grams of NAUGARD N445 antioxidant (obtained from Uniroyal Chemical Co., Middlebury, Conn.). The molten mixture was mixed for 1 hour at 140° C. The resulting ink was a stable dispersion of pigment particles with no phase separation. No pigment particle aggregates were detected by optical microscopy at a magnification of 400×. The ink was filtered through successively finer filters of which the last was 0.45 micron. For comparative purposes, a similar ink was prepared containing no carbon black and containing 3.5 percent by weight SAVINYL BLACK NS dye (obtained from Clariant) and 2 percent by weight Disperse Orange 47 dye.

EXAMPLE II

The carbon black containing ink and the dye containing ink were each used to generate print samples on HAMMERMILL LASERPRINT® paper using standard drawdown techniques. The images were measured for L*a*b* using ASTM E308 (Standard Method for Computing the Colors of Objects using the CIE System) in order to calculate the 1976 CIE L* (lightness-darkness) a* (redness-greenness) and b* (yellowness-blueness) CIELAB values for each phase change ink sample at time zero. The images were then exposed to UV light in an Atlas Suntest XLS+ to simulate lightfastness over years. The average print sees 450 lux×12 hours/day×365 days/year=1.971×10⁶ lux-hrs/year. The light source was a Xenon Arc set to expose the images to 407 W/m², which puts out 100 Klux×24 hr/day=1.21 simulated years per day of exposure in the machine. The images were exposed to 100 Klux×24 hours/day×21.5 days=51.6×106 lux-hr, or 26 years. The images were measured periodically through the experiment and at the end. Thus, ΔE was calculated using the following formula: $\Delta E=((L_1^*-L_2^*)^2+(a_1^*-a_2^*)^2+(b_1^*-b_2^*)^2)^{1/2}$. The results were as follows:

| Time (years) | carbon black ΔE | dye ΔE |
| --- | --- | --- |
| 0 | 0.00 | 0.00 |
| 1 | 0.77 | 0.43 |
| 4 | 1.66 | 2.00 |
| 6 | 2.10 | 3.89 |
| 11 | 4.57 | 11.79 |
| 16 | 6.29 | 18.04 |
| 21 | 8.00 | 21.54 |
| 26 | 11.39 | 27.65 |

As the results indicate, the lightfastness, represented by ΔE, of the carbon black containing ink was substantially better than that of the dye containing ink after exposure corresponding to 26 years.

EXAMPLE III

Optical density of the carbon black containing ink was measured by generating with standard drawdown techniques an image about 9 microns thick and with about 60 percent ink coverage of the print surface. The optical density of the image thus generated was measured with a MacBeth Gretag Spectrolino to be 1.12, a desirable value comparable to the optical density generated by a dye at similar concentrations, which are higher than typical industry standard. (Common dye loadings are typically about 3 percent.)

EXAMPLE IV

The color space data for the carbon black containing ink and the dye containing ink were obtained on an ACS® Spectro Sensor® II Colorimeter (obtained from Applied Color Systems Inc.) in accordance with the measuring methods stipulated in ASTM 1E805 (Standard Practice of Instrumental Methods of Color or Color Difference Measurements of Materials) using the appropriate calibration standards supplied by the instrument manufacturer. For purposes of verifying and quantifying the overall colorimetric performance of the inks, measurement data were reduced, via tristimulus integration, following ASTM E308 (Standard Method for Computing the Colors of Objects using the CIE System) in order to calculate the 1976 CIE a* (redness-greenness) and b* (yellowness-blueness) CIELAB values for each phase change ink sample. Neutral values in each instance are 0.00. The results were as follows:

| Sample | a* | b* |
| --- | --- | --- |
| carbon black ink | 0.86 | −0.15 |
| dye ink | 2.42 | −6.92 |

As the results indicate, the ink containing the carbon black colorant was substantially closer to neutral in color than the ink containing the dye colorant.

EXAMPLE V

An ink composition is prepared as described in Example I except that 5 grams of tetraethylene glycol dodecyl ether (NIKKOL BL-4SY, available from Nikko Chemicals) is also added to the ink. It is believed that multilayered liposomes will be formed around the pigment particles in the ink, thereby further enhancing solubility of the pigment in the ink.

Other embodiments and modifications may occur to those of ordinary skill in the art subsequent to a review of the information presented herein; these embodiments and modifications, as well as equivalents thereof, are also included within the scope of this invention.

The recited order of processing elements or sequences, or the use of numbers, letters, or other designations therefor, is not intended to limit a claimed process to any order except as specified in the claim itself.

What is claimed is:

1. A phase change ink composition comprising (a) an ink carrier comprising (1) a polyalkylene wax and (2) a component selected from the group consisting of (A) amides, (B) esters, (C) ester-amides, (D) urethanes, (E) ureas, (F) urethane-ureas, and (G) mixtures thereof, and (b) pigment particles having hydrophobic functional groups covalently bonded to the surfaces thereof, said ink composition having a melting point no lower than about 40° C., said ink composition having a melting point no higher than about 160° C.

2. An ink according to claim 1 wherein the ink carrier comprises a monoamide.

3. An ink according to claim 2 wherein the monoamide is stearamide, behenamide, oleamide, erucamide behenyl behenamide, stearyl stearamide, stearyl erucamide, erucyl erucamide, oleyl palmitamide, erucyl stearamide, or mixtures thereof.

4. An ink according to claim 2 wherein the monoamide is stearamide.

5. An ink according to claim 2 wherein the monoamide is of the formula

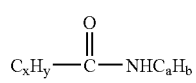

wherein x is an integer of from about 5 to about 21, y is an integer of from about 11 to about 43, a is an integer of from about 6 to about 22, and b is an integer of from about 13 to about 45.

6. An ink according to claim 2 wherein the monoamide is of the formula

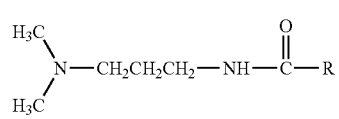

wherein R is a long chain hydrocarbon with from about 12 to about 48 carbon atoms.

7. An ink according to claim 2 wherein the monoamide is of the formula

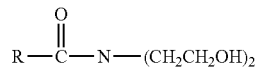

wherein R is a long chain hydrocarbon with from about 12 to about 48 carbon atoms.

8. An ink according to claim 1 wherein the ink carrier comprises a tetra-amide.

9. An ink according to claim 8 wherein the tetra-amide is of the formula

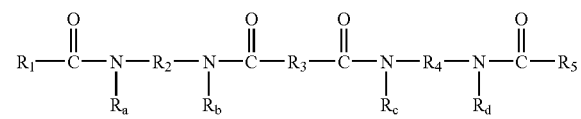

wherein $R_a$, $R_b$, $R_c$, and $R_d$ each, independently of the others, is (a) a hydrogen atom, (b) an alkyl group, (c) an aryl group, (d) an arylalkyl group, or (e) an alkylaryl group, $R_2$, $R_3$, and $R_4$ each, independently of the others, are (a) an alkylene group, (b) an arylene group, (c) an arylalkylene group, or (d) an alkylarylene group, and $R_1$ and $R_5$ each, independently of the other, is (a) an alkyl group, (b) an aryl group, (c) an arylalkyl group, or (d) an alkylaryl group.

10. An ink according to claim 9 wherein at least one of $R_1$ and $R_5$ is an alkyl group with about 18 carbon atoms.

11. An ink according to claim 9 wherein at least one of $R_1$ and $R_5$ is an alkyl group with about 48 carbon atoms.

12. An ink according to claim 9 wherein $R_1$ and $R_5$ are both —$(CH_2)_{16}CH_3$, $R_2$ and $R_4$ are each —$CH_2CH_2$—, and $R_3$ is a branched unsubstituted alkyl group having about 34 carbon atoms.

13. An ink according to claim 9 wherein $R_1$ and $R_5$ are both —$(CH_2)_nCH_3$ wherein n is 47 or 48, $R_2$ and $R_4$ are each —$CH_2CH_2$—, and $R_3$ is a branched unsubstituted alkyl group having about 34 carbon atoms.

14. An ink according to claim 1 wherein the ink carrier comprises a urethane.

15. An ink according to claim 1 wherein the ink carrier comprises a urea.

16. An ink according to claim 1 wherein the ink carrier comprises a urethane/urea.

17. An ink according to claim 1 wherein the ink carrier comprises a mixture of at least one amide and at least one urethane.

18. An ink according to claim 1 wherein the ink carrier comprises an ester.

19. An ink according to claim 1 wherein the ink carrier comprises an ester-amide.

20. An ink according to claim 1 wherein the polyalkylene wax is a polyethylene, a polypropylene, a polybutylene, or a mixture thereof.

21. An ink according to claim 1 wherein the polyalkylene wax is a polyethylene.

22. An ink according to claim 21 wherein the polyethylene is of the formula $CH_3$—$(CH_2)_n$—$CH_3$ wherein n is an integer representing the number of repeat —$CH_2$— units, wherein n is at least about 30, and wherein n is no more than about 214.

23. An ink according to claim 1 wherein the polyalkylene wax is present in the ink carrier in an amount of at least about 15 percent by weight.

24. An ink according to claim 1 wherein the polyalkylene wax is present in the ink carrier in an amount of no more than about 60 percent by weight.

25. An ink according to claim 1 wherein the phase change ink carrier comprises (a) a polyethylene wax, (b) a stearyl stearamide wax, (c) a dimer acid based tetra-amide that is the reaction product of dimer acid, ethylene diamine, and a long chain hydrocarbon having greater than thirty six carbon atoms and having a terminal carboxylic acid group, (d) a urethane resin derived from the reaction of two equivalents of hydroabietyl alcohol and one equivalent of isophorone diisocyanate, (e) a urethane resin that is the adduct of three equivalents of stearyl isocyanate and a glycerol-based alcohol, and (f) an antioxidant.

26. An ink according to claim 1 wherein the phase change ink carrier comprises (a) a polyethylene wax in an amount of at least about 15 percent by weight of the ink and in an amount of no more than about 60 percent by weight of the ink, (b) a stearyl stearamide wax in an amount of at least about 8 percent by weight of the ink and in an amount of no more than about 32 percent by weight of the ink, (c) a dimer acid based tetra-amide that is the reaction product of dimer acid, ethylene diamine, and a carboxylic acid having at least about 36 carbon atoms in an amount of at least about 10 percent by weight of the ink and in an amount of no more than about 32 percent by weight of the ink, (d) a urethane resin derived from the reaction of two equivalents of hydroabietyl alcohol and one equivalent of isophorone diisocyanate in an amount of at least about 6 percent by weight of the ink and in an amount of no more than about 16 percent by weight of the ink, (e) a urethane resin that is the adduct of three equivalents of stearyl isocyanate and a glycerol-based alcohol in an amount of at least about 2 percent by weight of the ink and in an amount of no more than about 13 percent by weight of the ink, and (f) an antioxidant in an amount of at least about 0.01 percent by weight of the ink and in an amount of no more than about 1 percent by weight of the ink.

27. An ink according to claim 1 wherein the ink carrier is present in the phase change ink in an amount of at least about 0.1 percent by weight of the ink, and wherein the ink carrier is present in the phase change ink in an amount of no more than about 99 percent by weight of the ink.

28. An ink according to claim 1 wherein the phase change ink carrier has a Hildebrand solubility parameter of at least about 8.3 $(cal/cc)^{0.5}$.

29. An ink according to claim 1 wherein the phase change ink carrier has a Hildebrand solubility parameter of no more than about 9.5 $(cal/cc)^{0.5}$.

30. An ink according to claim 1 wherein the pigment particles are present in the ink in an amount of at least about 0.1 percent by weight of the ink.

31. An ink according to claim 1 wherein the pigment particles are present in the ink in an amount of no more than about 50 percent by weight of the ink.

32. An ink according to claim 1 further containing a dye.

33. An ink according to claim 1 further containing a surfactant.

34. An ink according to claim 33 wherein the surfactant is capable of forming multilayered liposomes in the ink having hydrophobic centers in which pigment particles are situated and hydrophobic outer surfaces in contact with the ink carrier.

35. An ink according to claim 33 wherein the surfactant is a polyoxyethylene nonionic surfactant.

36. An ink according to claim 35 wherein the surfactant is ethyleneglycol mono n-decyl ether, diethyleneglycol mono n-decyl ether, triethyleneglycol mono n-decyl ether, tetraethyleneglycol mono n-decyl ether, pentaethyleneglycol mono n-decyl ether, hexaethyleneglycol mono n-decyl ether, heptaethyleneglycol mono n-decyl ether, octaethyleneglycol mono n-decyl ether, ethyleneglycol mono n-dodecyl ether, diethyleneglycol mono n-dodecyl ether, triethyleneglycol mono n-dodecyl ether, tetraethyleneglycol mono n-dodecyl ether, pentaethyleneglycol mono n-dodecyl ether, hexaethyleneglycol mono n-dodecyl ether, heptaethyleneglycol mono n-dodecyl ether, octaethyleneglycol mono n-dodecyl ether, ethyleneglycol mono n-tetradecyl ether, diethyleneglycol mono n-tetradecyl ether, triethyleneglycol mono n-tetradecyl ether, tetraethyleneglycol mono n-tetradecyl ether, pentaethyleneglycol mono n-tetradecyl ether, hexaethyleneglycol mono n-tetradecyl ether, heptaethyleneglycol mono n-tetradecyl ether, octaethyleneglycol mono n-tetradecyl ether, ethyleneglycol mono n-hexadecyl ether, diethyleneglycol mono n-hexadecyl ether, triethyleneglycol mono n-hexadecyl ether, tetraethyleneglycol mono n-hexadecyl ether, pentaethyleneglycol mono n-hexadecyl ether, hexaethyleneglycol mono n-hexadecyl ether, heptaethyleneglycol mono n-hexadecyl ether, octaethyleneglycol mono n-hexadecyl ether, or mixtures thereof.

37. An ink according to claim 35 wherein the surfactant is tetraethylene glycol dodecyl ether.

38. An ink according to claim 35 wherein the surfactant is present in an amount of at least about 50 percent by weight of the pigment.

39. A process which comprises (I) incorporating into an ink jet printing apparatus a phase change ink composition comprising (a) an ink carder comprising (1) a polyalkylene wax and (2) a component selected from the group consisting of (A) amides, (B) esters, (C) ester-amides, (D) urethanes, (E) ureas, (F) urethane-ureas, and (G) mixtures thereof, and (b) pigment particles having hydrophobic functional groups covalently bonded to the surfaces thereof, said ink composition having a melting point no lower than about 40° C., said ink composition having a melting point no higher than about 160° C.; (II) melting the ink and (III) causing droplet of the melted ink to be ejected in an imagewise pattern onto a substrate.

40. A process according to claim 39 wherein the printing apparatus employs a piezoelectric printing process wherein droplets of the ink are caused to be ejected in imagewise pattern by oscillations of piezoelectric vibrating element.

41. A process according to claim 39 wherein the substrate is a final recording sheet and droplet of the melted ink are ejected in an imagewise pattern directly onto the final recording sheet.

42. A process according to claim 39 wherein the substrate is an intermediate transfer member and droplets of the melted ink are ejected in an imagewise pattern onto the intermediate transfer member followed by transfer of the imagewise pattern from the intermediate transfer member to a final recording sheet.

43. A process according to claim 42 wherein the intermediate transfer member is heated to a temperature above that of the final recording sheet and below that of the melted ink in the printing apparatus.

44. An ink according to claim 1 wherein the hydrophobic functional groups are (i) alkyl groups, including saturated, unsaturated, cyclic, substituted, and unsubstituted alkyl groups, and wherein oxygen, nitrogen, sulfur, silicon, and phosphorus hetero atoms either may or may not be present in the alkyl group, (ii) aryl groups, including unsubstituted and substituted aryl groups, and wherein hetero atoms either may or may not be present in the aryl group, (iii) arylalkyl groups, including unsubstituted and substituted arylalkyl groups, wherein the alkyl portion of the arylalkyl group can be saturated, unsaturated, and/or cyclic, and wherein hetero atoms either may or may not be present in either or both of the alkyl portion and the aryl portion of the arylalkyl group, (iv) alkylaryl groups, including unsubstituted and substituted alkylaryl groups, wherein the alkyl portion of the alkylaryl group can be saturated, unsaturated, and/or cyclic, and wherein hetero atoms either may or may not be present in either or both of the alkyl portion and the aryl portion of the alkylaryl group, or (v) mixtures thereof.

45. An ink according to claim 1 wherein the hydrophobic functional groups are of the formula -X-Sp-(polymer)-R wherein X is (i) an alkylene group, including saturated, unsaturated, cyclic, substituted, and unsubstituted alkylene groups, and wherein hetero atoms either may or may not be present in the alkylene group, (ii) an arylene group, including substituted and unsubstituted arylene groups, and wherein hetero atoms either may or may not be present in the arylene group, (iii) an arylalkylene group, including unsubstituted and substituted arylalkylene groups, wherein the alkyl portion of the arylalkylene group can be saturated, unsaturated, and/or cyclic, and wherein hetero atoms either may or may not be present in either or both of the alkyl portion and the aryl portion of the arylalkylene group, (iv) an alkylarylene group, including substituted and unsubstituted alkylarylene groups, and wherein hetero atoms either may or may not be present in either or both of the alkyl portion and the aryl portion of the alkylarylene group, wherein Sp is a spacer group which is either a direct bond or a chemical group, wherein R is (i) a hydrogen atom, (ii) an alkyl group, including saturated, unsaturated, cyclic, substituted, and unsubstituted alkyl groups, and wherein hetero atoms either may or may not be present in the alkyl group, (iii) aryl group, including substituted and unsubstituted aryl groups, and wherein hetero atoms either may or may not be present in the aryl group, (iv) an arylalkyl group, including unsubstituted and substituted arylalkyl groups, wherein the alkyl portion of the arylalkyl group can be saturated, unsaturated, and/or cyclic, and wherein hetero atoms either may or may not be present in either or both of the alkyl portion and the aryl portion of the arylalkyl group, or (v) an alkylaryl group, including substituted and unsubstituted alkylaryl groups, and wherein hetero atoms either may or may not be present in either or both of the alkyl portion and the aryl portion of the alkylaryl group, and wherein (polymer) comprises repeating monomer groups or multiple monomer groups or both.

* * * * *